United States Patent
Copeland, Jr.

(10) Patent No.: US 11,070,115 B2
(45) Date of Patent: Jul. 20, 2021

(54) MOTOR/GENERATOR SYSTEM AND METHOD

(71) Applicant: Prototus, Ltd., San Pedro (BZ)

(72) Inventor: Carl E. Copeland, Jr., Burleson, TX (US)

(73) Assignee: Prototus, Ltd., Ambergris Caye (BZ)

( * ) Notice: Subject to any disclaimer, the term of this patent is extended or adjusted under 35 U.S.C. 154(b) by 797 days.

(21) Appl. No.: 15/404,328

(22) Filed: Jan. 12, 2017

(65) Prior Publication Data

US 2017/0201164 A1 Jul. 13, 2017

Related U.S. Application Data

(60) Provisional application No. 62/277,762, filed on Jan. 12, 2016, provisional application No. 62/278,229, filed on Jan. 13, 2016.

(51) Int. Cl.
| | |
|---|---|
| *H02K 16/02* | (2006.01) |
| *H02K 21/24* | (2006.01) |
| *H02K 16/00* | (2006.01) |
| *H02K 21/12* | (2006.01) |
| *H02K 1/16* | (2006.01) |
| *H02K 1/17* | (2006.01) |
| *H02K 1/22* | (2006.01) |
| *H02K 7/18* | (2006.01) |
| *H02K 1/02* | (2006.01) |

(52) U.S. Cl.
CPC ............. *H02K 16/02* (2013.01); *H02K 1/16* (2013.01); *H02K 1/17* (2013.01); *H02K 1/22* (2013.01); *H02K 7/1838* (2013.01); *H02K 16/00* (2013.01); *H02K 21/12* (2013.01); *H02K 21/24* (2013.01); *H02K 1/02* (2013.01); *Y02E 10/72* (2013.01)

(58) Field of Classification Search
CPC .......... H02K 7/16; H02K 7/18; H02K 7/1807; H02K 7/1823; H02K 7/183; H02K 7/1838; H02K 21/14; H02K 21/16; H02K 1/182; H02K 1/2793
USPC .................................................. 310/112, 114
See application file for complete search history.

(56) References Cited

U.S. PATENT DOCUMENTS

| | | |
|---|---|---|
| 3,430,126 A | 2/1969 | Richardson et al. |
| 4,520,284 A | 5/1985 | Wolcott |
| 6,633,106 B1 | 10/2003 | Swett |
| 6,750,588 B1 | 6/2004 | Gabrys |
| 2015/0180321 A1 | 6/2015 | Copeland, Jr. |
| 2016/0308411 A1* | 10/2016 | Watanabe ............. H02K 16/02 |

FOREIGN PATENT DOCUMENTS

WO  WO-2012078372 A8 *  6/2013  ........... H02K 7/1807

OTHER PUBLICATIONS

International Search Report and Written Opinion regarding PCT App. No. PCT/US17/13104 dated May 16, 2017, pp. 1-13.

* cited by examiner

*Primary Examiner* — Quyen P Leung
*Assistant Examiner* — Minki Chang
(74) *Attorney, Agent, or Firm* — Dunlap Codding, P.C.

(57) ABSTRACT

An electromagnetic motor/generator comprising a flux assembly having at least one coil and at least one magnetic field source separated by a first gap and a second gap and an interference drum which is movable relative to the at least one coil and to the at least one magnetic field source to alternatively position at least one first magnetically permeable section and at least one second magnetically permeable section inside the first and second gaps.

11 Claims, 32 Drawing Sheets

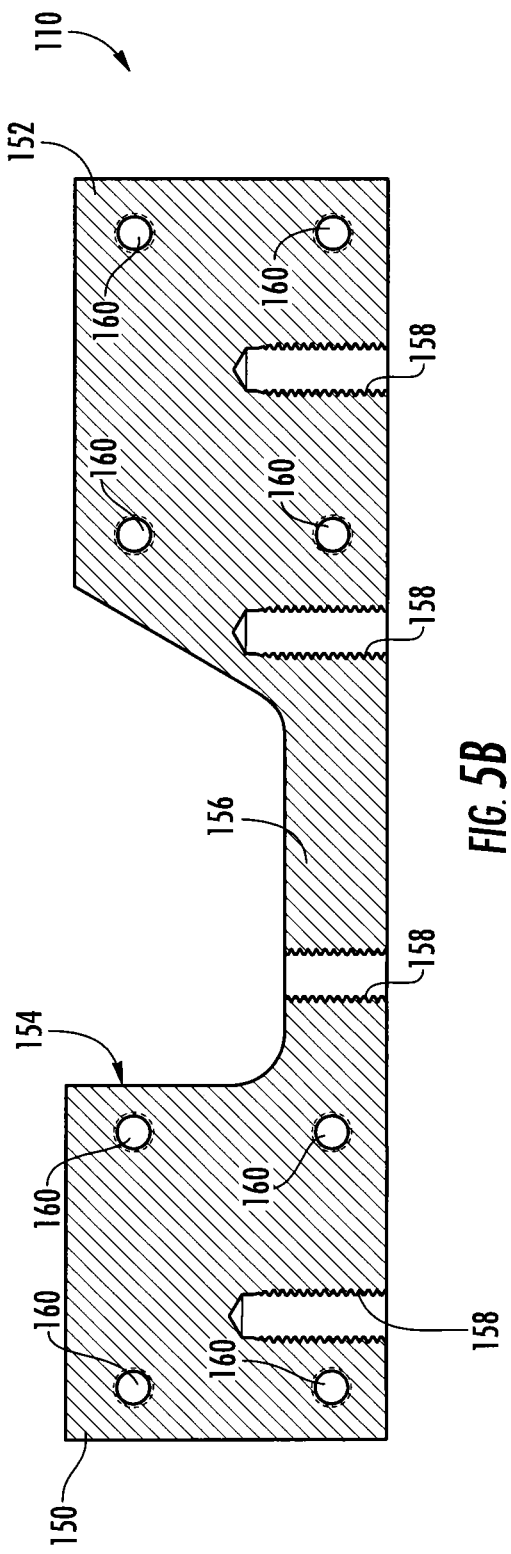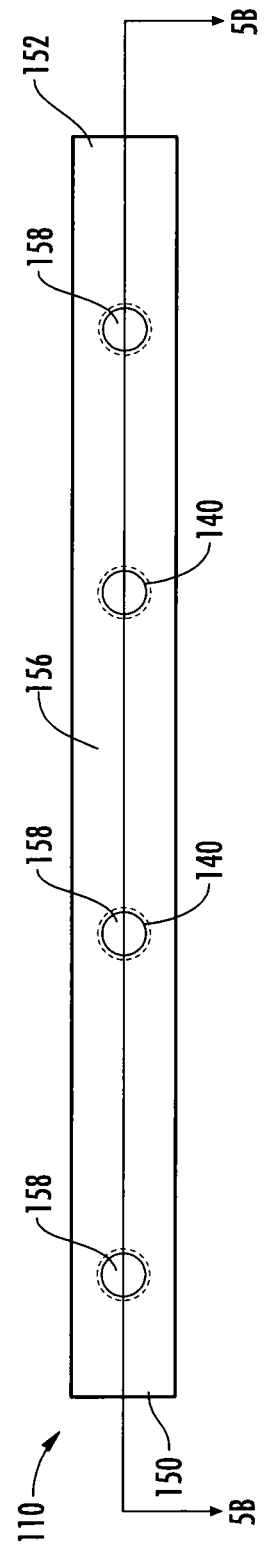
FIG. 5A
FIG. 5B

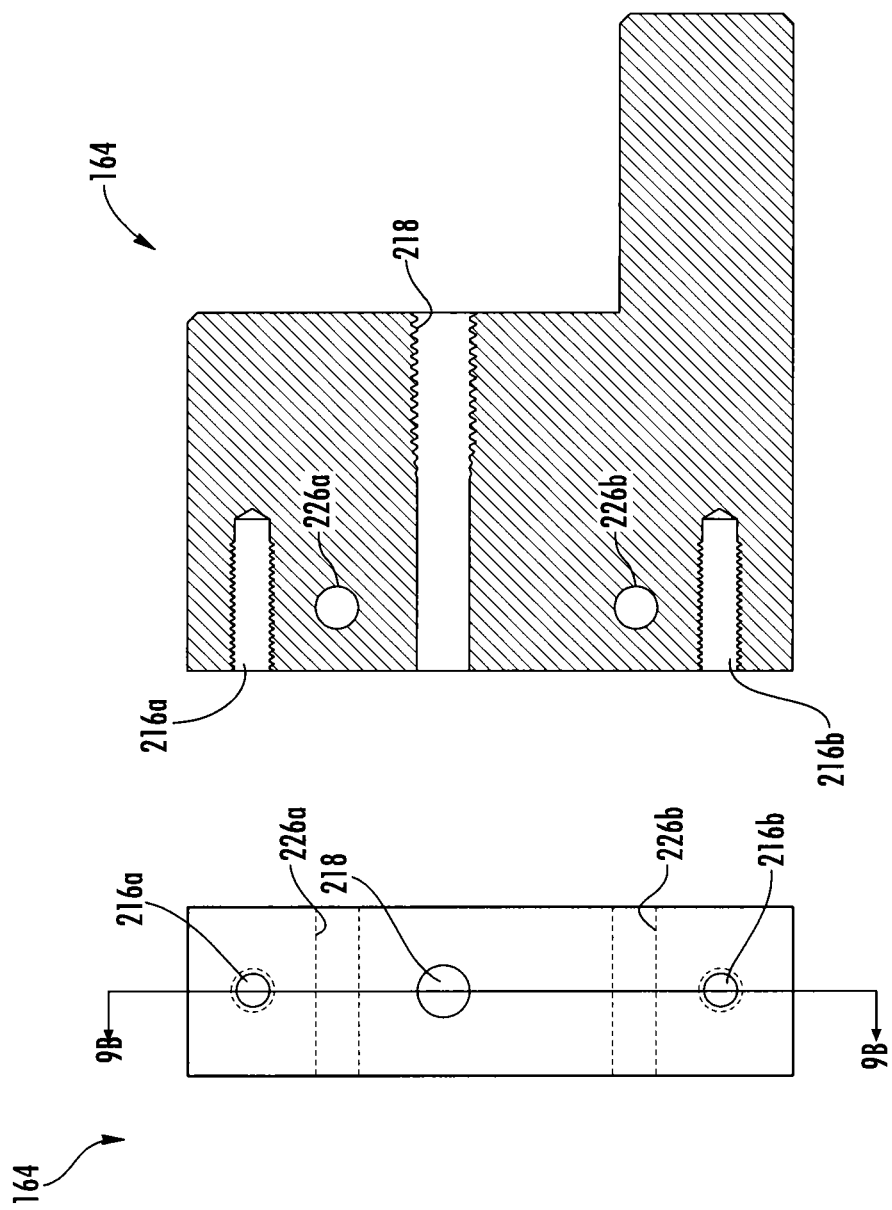

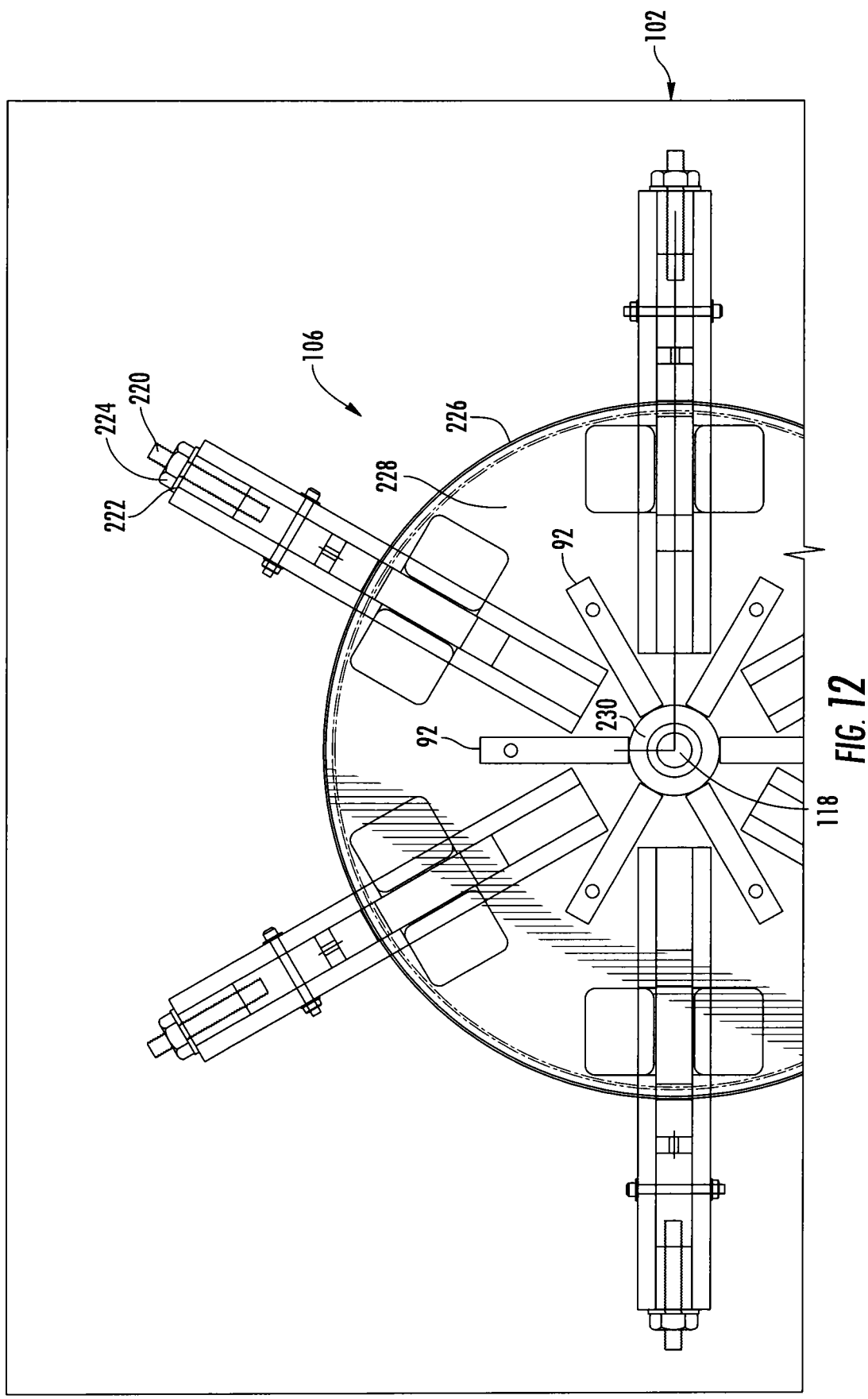

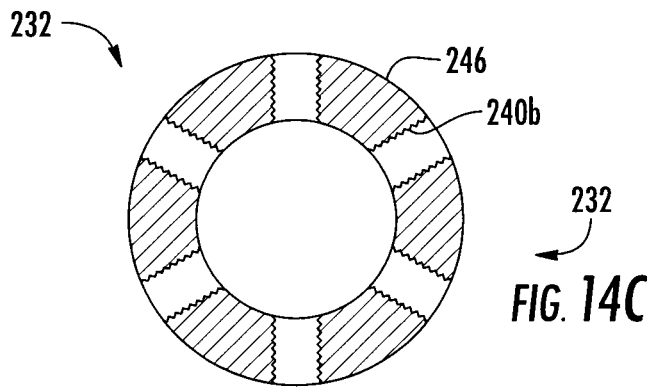
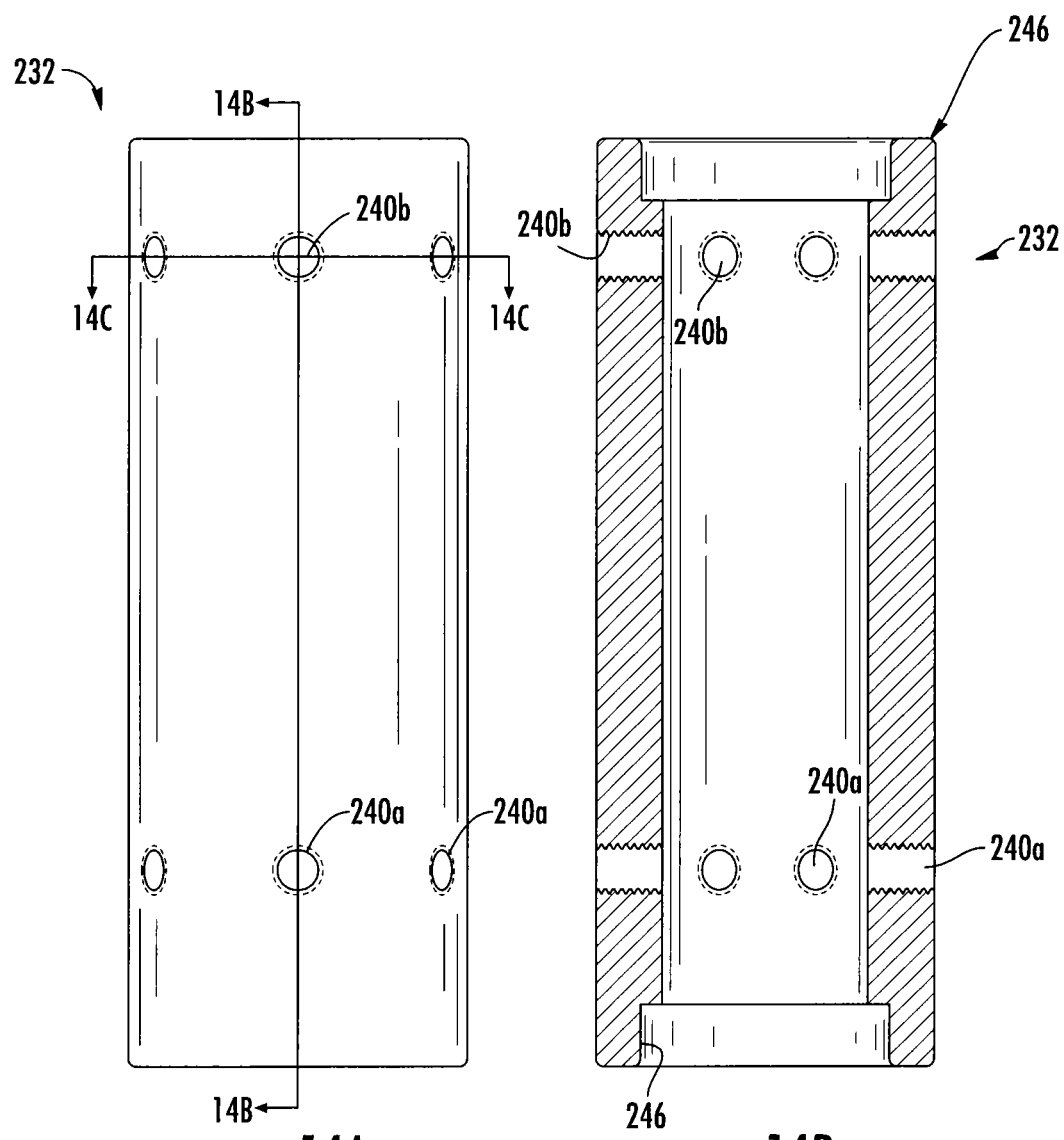
FIG. 14C
FIG. 14A
FIG. 14B

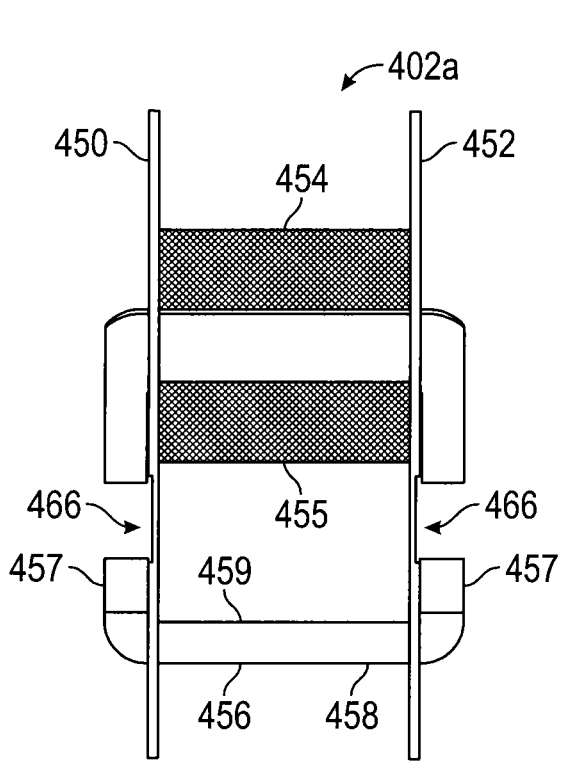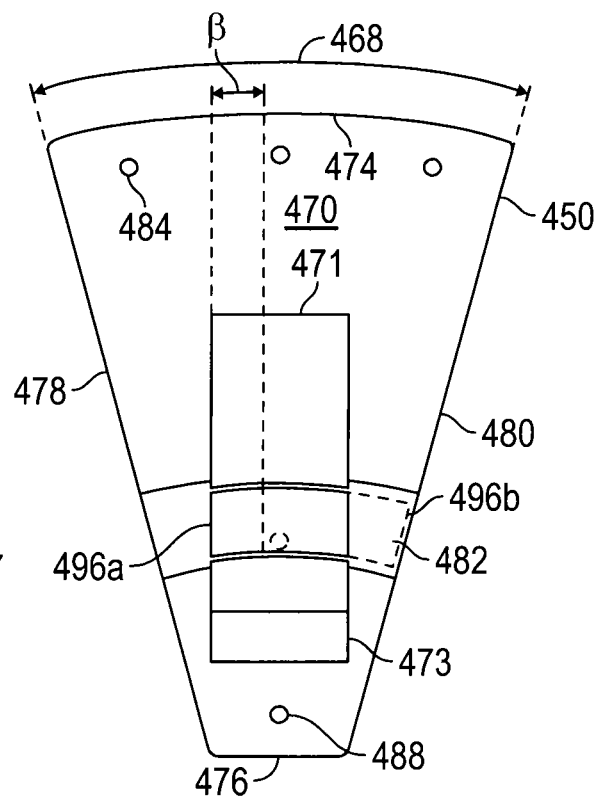
FIG. 30A  FIG. 30B
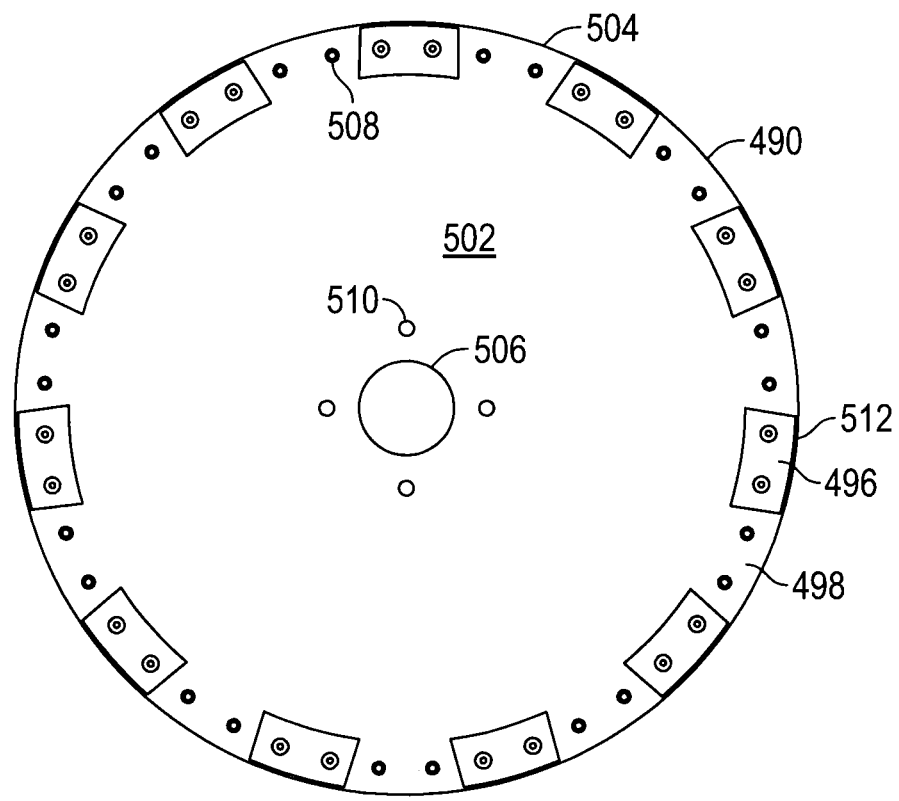
FIG. 31

MOTOR/GENERATOR SYSTEM AND METHOD

INCORPORATION BY REFERENCE

This application claims priority to U.S. Provisional Application No. 62/277,762 filed Jan. 12, 2016 and U.S. Provisional Application No. 62/278,229 filed Jan. 13, 2016 both of which are expressly incorporated herein in their entirety.

BACKGROUND

The wind has historically been one of the most widely used natural resources to provide the energy necessary to power our needs. Windmills are still used to harness the wind's energy to grind grains into flour. Sailboats and windsurfs use sails to capture the power of the wind to travel across water. Recent increases in the demand for energy, combined with the dwindling supplies of fossil fuels, have caused electrical utility companies to take a renewed look at alternative methods for producing electrical power.

One alternative method of producing electrical power involves the harnessing of wind energy by a wind turbine to drive an electromagnetic generator. Wind turbines typically use a series of blades fixed to the top of a tower to rotate a shaft about a horizontal axis. The blades have an aerodynamic shape, such that when wind blows across the surface of the blades a lift force is generated causing the blades to rotate the shaft about its axis. The shaft is connected, typically via a gearbox, to an electromagnetic generator located in a structure called a nacelle which is positioned behind the blades. The gearbox converts the rotation speed of the blades into a rotation speed usable by the generator to produce electricity at a frequency that is proper for the electrical grid it is providing power to. The nacelle houses a number of components which are needed in modern high capacity wind turbines. In addition to the aforementioned gearbox and electromagnetic generator, other components may include a yaw drive which rotates the wind turbine, various controllers such as load balancing systems, and a brake that may be used to slow the generator down.

Electromagnetic generators are well known in the prior art. Broadly, electromagnetic generators generate electricity by varying a magnetic field, which induces electrical current in an adjacent coil. The magnetic field source has traditionally been a permanent magnet, but electromagnets have also been recently used.

Prior art devices typically use a magnetic field source, which is disposed adjacent to a coil, such that a small air gap separates the two. Several such pairs of magnetic field sources and coils may be used in a single device to increase efficiency. Most prior art devices operate by either moving the magnetic field source relative to the coil, or by moving the coil relative to the magnetic field source, to generate magnetic field fluctuations (also referred to as "magnetic flux" or "flux"), and thereby induce electrical current into the coils. To that end, most prior art devices use a stator and a rotor, the stator housing the stationary component, and the rotor moving the other component relative to the stationary one.

Additionally, there are several prior art devices that utilize a magnetic field blocking device to generate a magnetic flux within coils or windings to induce electrical current therein. The magnetic field blocking device is typically a magnetic field impermeable disk which has magnetic field permeable portions cut out in tooth-like or window-like configurations. The disk is disposed in the air gap between the magnetic field source and the coil. The flux-blocking disk is rotated in such a way as to alternatively allow axial flux to pass through from the magnetic field source to the coil, or to redirect the axial flux away from the coil. Alternatively, the flux-blocking disk is held stationary, and one of the coils or magnetic field source are rotated. For examples of such prior art devices see U.S. Pat. Nos. 3,431,444, 3,983,430, 4,639, 626, and 6,140,730.

A major disadvantage of such prior art devices is the axial orientation of the flux relative to the disk, which poses three main problems. First, the surface area across which axial flux is generated is limited by the radius of the disk. Second, the frequency of the induced electrical current varies across the length of the radius of the disk, due to the varying angular velocity of various points along the radius. Third, the impermeable portions of the disk are pulled by the magnetic field source, and the permeable portions are not pulled by the magnetic field source as they cross the air gap between the magnetic field source and the coil. This alternating pull causes the disk to resonate laterally away from its axis of rotation, which resonating motion will hereinafter be referred to as "wobble." The wobble is proportionally related to the radius of the disc, the strength of the magnetic field, and the rotations-per-minute (rpm or rpms) at which the disc rotates, and is inversely related to the thickness of the disk. In order to minimize the wobble, efficiency is sacrificed by lowering rpm, increasing the air gap between the magnetic field source and the coils to accommodate a thicker disc, and/or reducing the radius of the disc and thereby the surface area across which flux is generated.

Accordingly, there exists a need for a more efficient electromagnetic generator capable of operating at relatively low rpm and producing electrical current with minimal efficiency loss due to disk wobble, small surface area across which flux is generated, and/or air gap size. The inventive concepts disclosed herein are directed to such an electromagnetic generator/motor and to method of using thereof.

BRIEF DESCRIPTION OF SEVERAL VIEWS OF THE DRAWINGS

Like reference numerals in the drawings represent and refer to the same element or function. Implementations of the disclosure may be better understood when consideration is given to the following detailed description thereof. Such description makes reference to the annexed pictorial illustrations, schematics, graphs, drawings, and appendices. In the drawings:

FIG. 5A is a bottom plan view of the flux base shown in FIG. 2.

FIG. 5B is a cross-sectional view along line 5B-5B of FIG. 5A.

FIG. 9A is an end view of a slide of the magnet assembly shown in FIG. 8.

FIG. 9B is a cross-sectional view along line 9B-9B of FIG. 9A.

FIG. 12 is a top view of the generator shown in FIG. 2.

FIG. 14A is a side view of the bearing tube of the shaft support assembly shown in FIG. 13A.

FIG. 14B is a cross-sectional view taken along line 14B-14B of FIG. 14A.

FIG. 14C is a cross-sectional view taken along line 14C-14C of FIG. 14A.

FIG. 30A is a partial cross-sectional view of a flux assembly of the motor/generator in accordance with the inventive concepts disclosed herein.

FIG. 30B is a plan view of a flux plate in accordance with the inventive concepts disclosed herein.

FIG. 31 is a plan view of a rotor plate in accordance with the inventive concepts disclosed herein.

DETAILED DESCRIPTION

Figure 1:
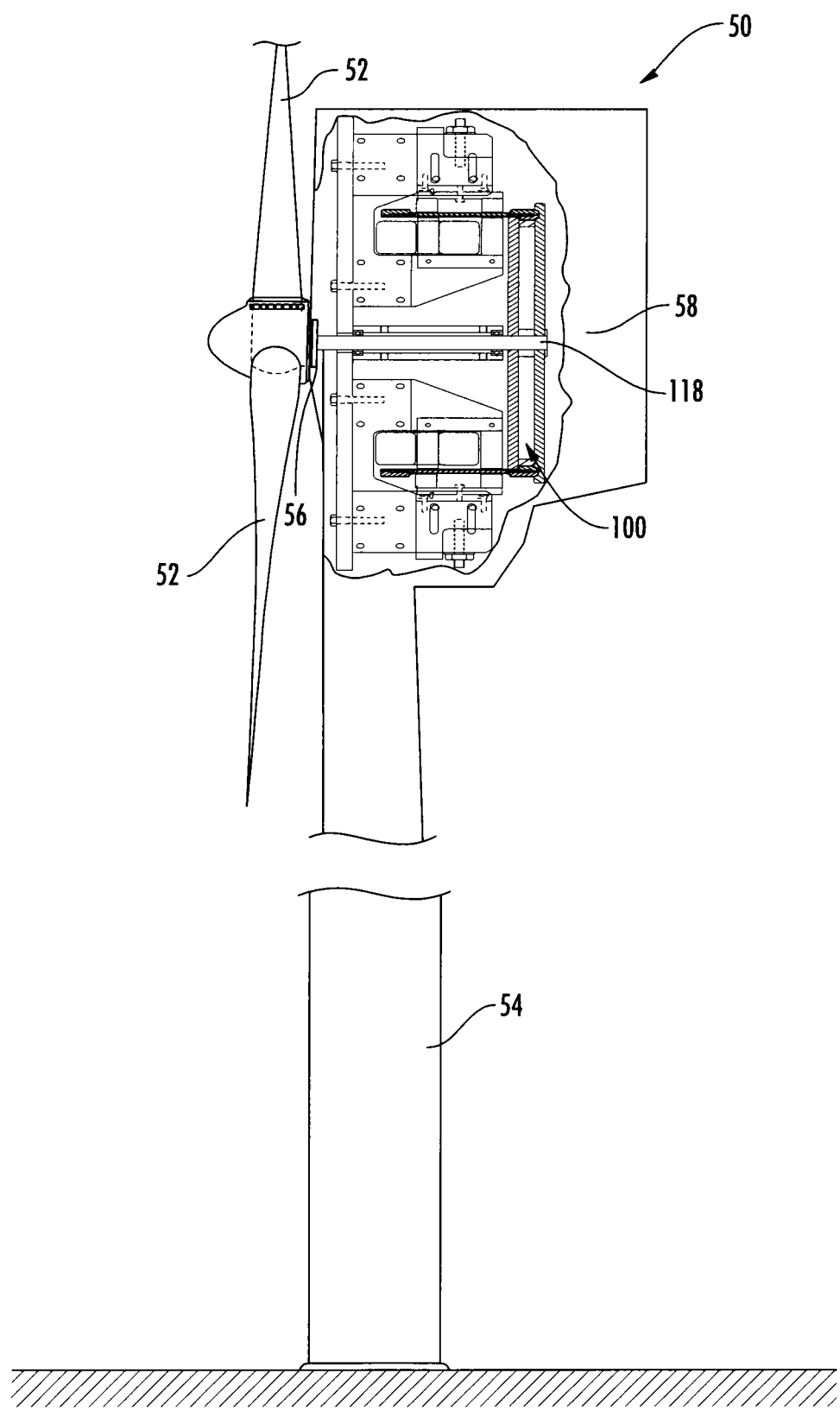
FIG. 1 is a partial cutout perspective view of a wind generator assembly constructed according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings unless otherwise noted. The disclosure is capable of other embodiments or of being practiced or carried out in various ways. Also, it is to be understood that the phraseology and terminology employed herein is for the purpose of description and should not be regarded as limiting.

In the following detailed description of embodiments of the disclosure, numerous specific details are set forth in order to provide a more thorough understanding of the inventive concepts disclosed herein. However, it will be apparent to one of ordinary skill in the art that the inventive concepts within the disclosure may be practiced without these specific details. In other instances, well-known features have not been described in detail to avoid unnecessarily complicating the description.

As used herein the notation "a-n" appended to a reference numeral is intended as merely convenient shorthand to reference one, or more than one, and up to infinity, of the element or feature identified by the respective reference numeral (e.g., 100*a-n*). Similarly, a letter following a reference numeral is intended to reference an embodiment of the feature or element that may be similar, but not necessarily identical, to a previously described element or feature bearing the same reference numeral (e.g., 100, 100*a*, 100*b*, etc.). Such shorthand notations are used for purposes of clarity and convenience only, and should not be construed to limit the inventive concepts disclosed herein in any way, unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concepts. This description should be read to include one or at least one and the singular also includes the plural unless it is obvious that it is meant otherwise.

As used in the description herein, the terms "comprises," "comprising," "includes," "including," "has," "having," or any other variations thereof, are intended to cover a non-exclusive inclusion. For example, unless otherwise noted, a process, method, article, or apparatus that comprises a list of elements is not necessarily limited to only those elements, but may also include other elements not expressly listed or inherent to such process, method, article, or apparatus.

As used herein the terms "axial," "axially," and any variations thereof, are intended to include extending substantially parallel to, or along the same line as, an axis of rotation.

As used herein the terms "air gap," "gap," and any variations thereof shall be understood to include a distance separating two or more objects or surfaces, regardless of whether a gas or fluid is between the objects or surfaces, unless expressly stated to the contrary.

Further, as used herein the terms "radial," "radially," and any variations thereof are intended to include extending along a radius, or a line substantially perpendicular to an axis of rotation.

As used herein, the terms "magnetic permeable", "magnetically permeable", "magnetic field permeable", "magnetic impermeable", "magnetic field impermeable", "magnetically impermeable" and the like are intended to refer to a difference in the amount of magnetic permeability between the materials forming the "permeable" and "impermeable" segments.

Finally, as used herein any reference to "one embodiment" or "an embodiment" means that a particular element, feature, structure, or characteristic described in connection with the embodiment is included in at least one embodiment. The appearances of the phrase "in some embodiments," "one example" or "in one embodiment" in various places in the specification are not necessarily all referring to the same embodiment, for example.

The inventive concepts disclosed herein are directed to an apparatus that may be configured to operate as a motor or a generator of electrical energy. Broadly, the motor/generator comprises one or more pairs of radially oriented and concentrically disposed opposing stationary pairs of magnetic field sources and coils separated by an axial air gap. An interference drum is disposed in the air gap separating the magnetic field sources and the coils, the interference drum having alternating magnetic field permeable zones and magnetic field impermeable zones along an axial surface thereof. In one embodiment where the apparatus is configured as a generator, when the interference drum is rotated, the magnetic field between the static magnetic field sources and the static coils is alternatively allowed to reach the coils, or redirected away from the coils by the alternating zones of the interference drum assembly. The resulting radial flux induces electrical current in the coils.

Referring now to the drawings and in particular to FIG. 1, a wind generator turbine 50 is shown as having a support assembly 54, one or more blades 52, a shaft 56, a generator assembly housing 58, and a generator assembly 100. The generator assembly 100 is shown through a partial cutout of the generator assembly housing 58. The generator assembly housing 58 is connected to the support assembly 54. The generator assembly housing 58 may also be referred to as a nacelle. The generator assembly 100 is positioned within the generator assembly housing 58, and the shaft 56 may connect the blades 52 to the generator assembly 100.

Figure 2:
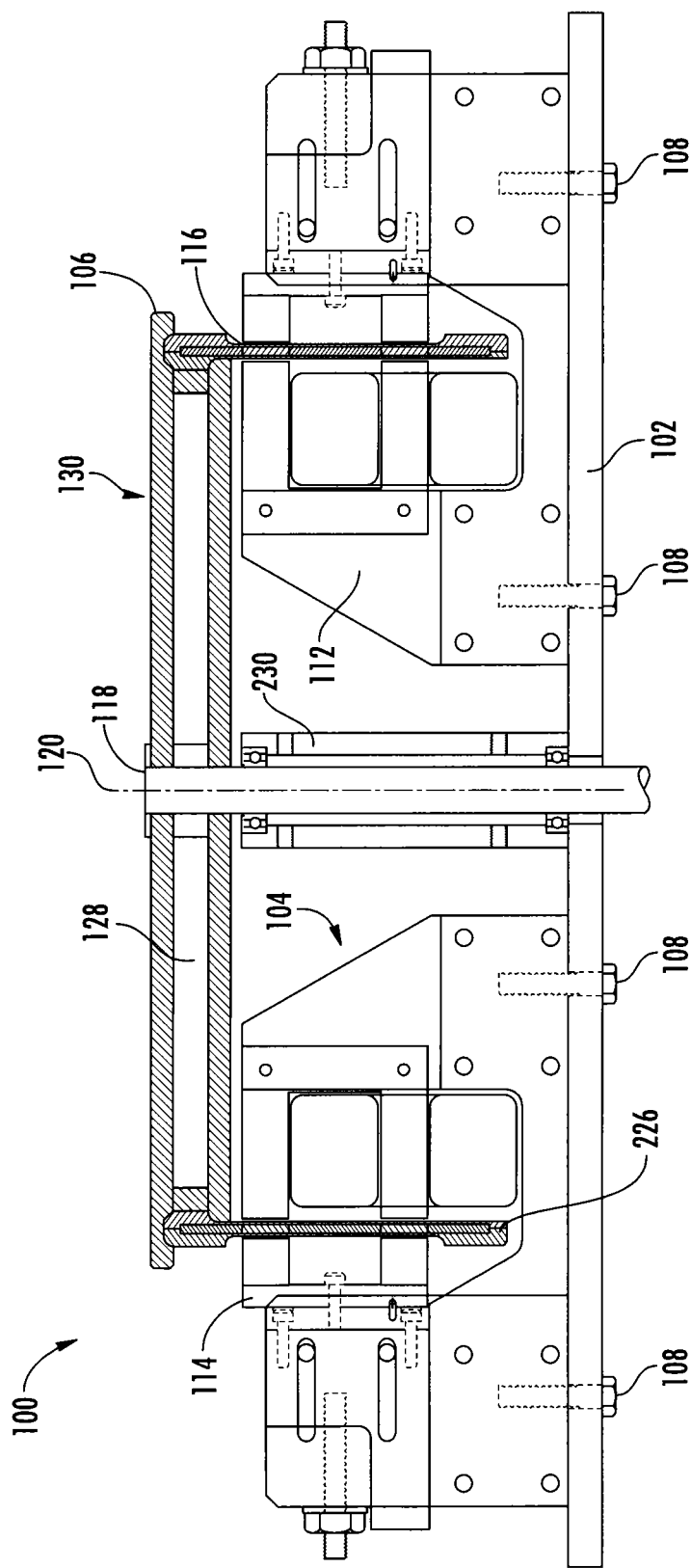
FIG. 2 is a side view showing an embodiment of a generator of electrical energy according to the inventive concepts disclosed herein, with a cross-section of the interference drum shown for clarity.
Figures 3A, 3B:
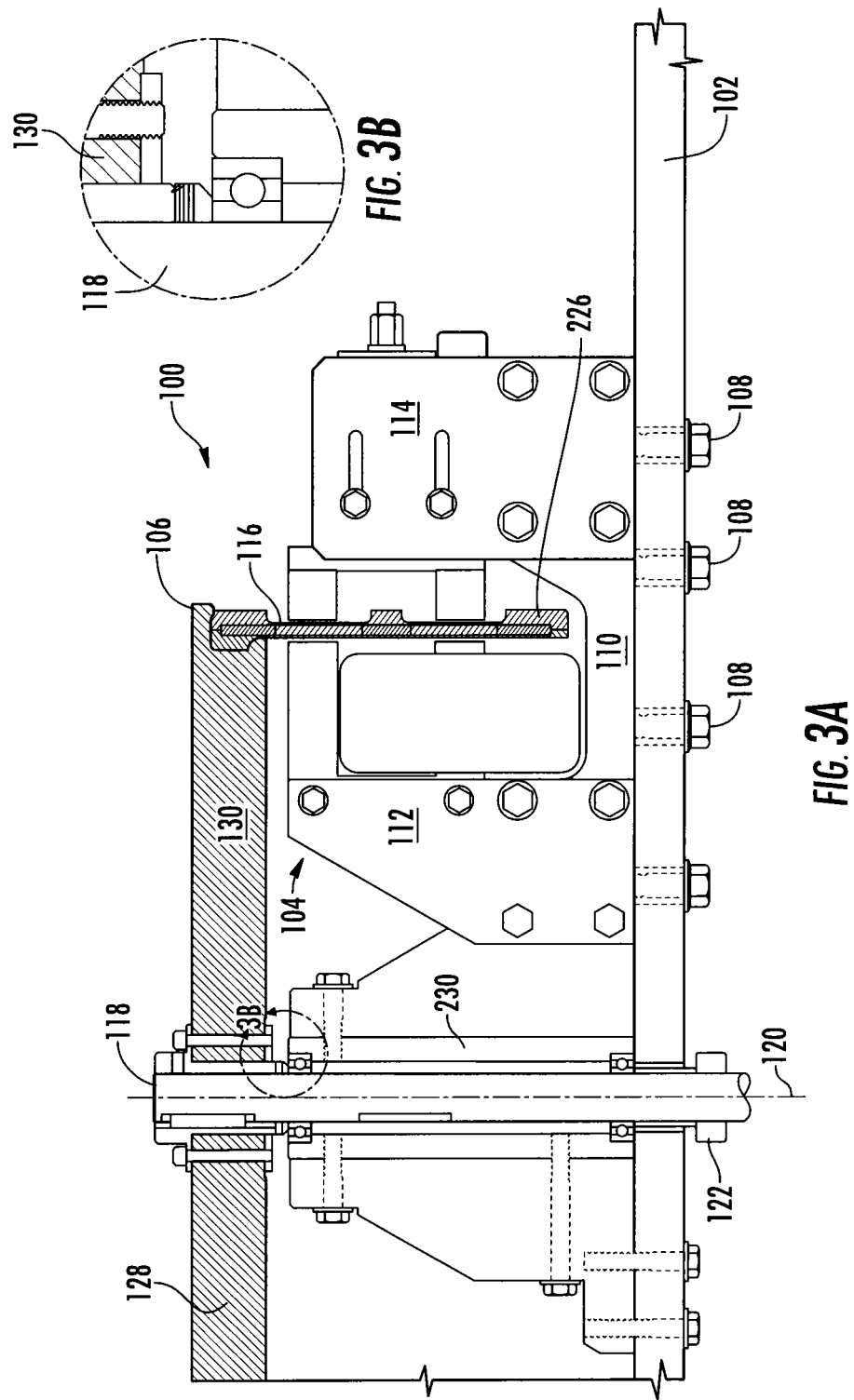
FIG. 3A is a side view of the generator of electrical energy shown in FIG. 2.
FIG. 3B is a fragmental detail view along line 3B of FIG. 3A.

Referring now to FIGS. 2-3B, the generator assembly 100 comprises a base plate 102, one or more flux assemblies 104*a* and 104*b* (two being shown for clarity), and an interference drum assembly 106. For the purposes of clarity, the base plate 102 shall be arbitrarily referenced hereinafter as oriented horizontally, and the orientations of the flux assemblies 104*a* and 104*b* and interference drum assembly 106 shall be discussed relative to a horizontally oriented base plate 102. It is to be understood however, that such orientation designations refer only to the orientation of the various components of the generator assembly 100 one relative to another, and do not necessarily relate to any external object, direction, or orientation. Such designations are made for purposes of clarity and convenience only, and are not to be regarded as limiting the inventive concepts disclosed herein in any way.

Figure 4:
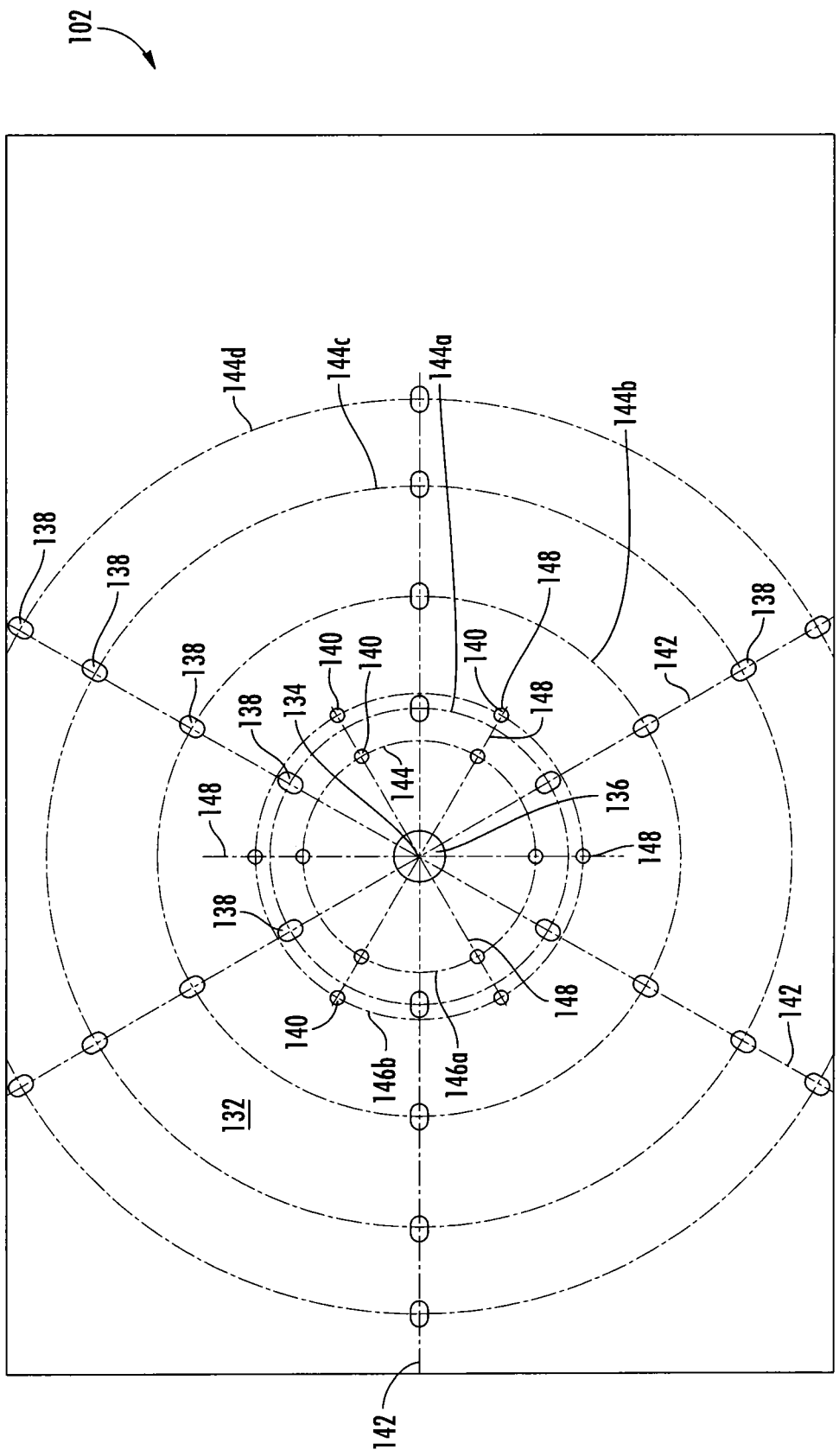
FIG. 4 is a top plan view of a base plate of the generator shown in FIG. 2.

In some embodiments, the base plate 102 may define a substantially horizontal disk-shaped flat surface (132, FIG. 4) having a center (134, FIG. 4). The flux assemblies 104*a* and 104*b* and the interference drum assembly 106 can be mounted onto the base plate 102 via base bolts 108, although other mounting methods can be used. In some embodiments, the flux assemblies 104*a* and 104*b* may extend substantially vertically from the base plate 102. The flux assemblies 104*a* and 104*b* are substantially identical in configuration and function so only the flux assembly 104*a* will be described hereinafter. The flux assembly 104*a* comprises a flux base 110, a coil assembly 112, and a magnet assembly 114. The coil assembly 112 and the magnet assembly 114 may be mounted onto the flux base 110, and are disposed opposite to one another. In some embodiments, the coil assembly 112 and magnet assembly 114 may be arranged in a radial orientation relative to the center of the base plate 102, and separated by an axial annular air gap 116, in which the interference drum assembly 106 may be at least partially disposed. While the coil assembly 112 is shown as being closer to the center 134 of the base plate 102 than the magnet assembly 114, it is to be understood that alternatively the magnet assembly 114 can be disposed closer to the center 134 of the base plate 102 than the coil assembly 112.

The generator assembly 100 may comprise six flux assemblies 104*a* mounted onto the base plate 102 such that the flux assemblies 104a are symmetrically disposed about the disk-shaped surface 132 (FIG. 4) defined by the base plate 102. In some embodiments, the distance between any two of the six flux assemblies 104a may be equal to the distance between any other two flux assemblies 104a, resulting in the six flux assemblies 104a being separated by 60° along the disk-shaped surface 132 (FIG. 4) of the base plate 102 and extending radially from the center 134 (FIG. 4) thereof. It is to be understood, however, that a different number of flux assemblies 104a can be used with the inventive concepts disclosed herein without departing from the scope of the present disclosure.

The interference drum assembly 106 may extend substantially vertically from the base plate 102. The interference drum assembly 106 comprises a shaft 118, a shaft housing 230, a hub assembly 128, and a drum 226. The shaft 118 has a central axis 120, and may extend substantially perpendicular to the base plate 102 through the center 134 of the base plate 102. The end of the shaft 118 extending below the base plate 102 can be retained by a shaft collar 122 (see FIG. 3A), for example. The shaft 118 can be substantially cylindrical in shape and can be made from any suitable material having sufficient strength and durability. In some embodiments, non-conductive and/or non-ferrous materials may be used to limit the potential of eddy currents being induced within the generator assembly 100. The shaft 118 connects to the hub assembly 128 using any suitable arrangement. The hub assembly 128 may comprise a substantially cylindrical hub 130, or may comprise one, two, or more spokes (not shown) connecting the shaft 118 and the drum 226. In some embodiments, the hub 130 may be substantially parallel to the surface 132 of the base plate 102. The hub 130 connects to the shaft 118. The hub 130 can be made from any suitable material with the desired strength and durability. In some embodiments, non-conductive and/or non-ferrous materials may be used to limit the potential of eddy currents being induced within the generator assembly 100.

The drum 226 may include a substantially cylindrical sidewall 276. The drum 226 is connected to the hub 130. In some embodiments, the drum 226 may be substantially perpendicular to the base plate 102 and may be adapted to rotate around the center 134 of the base plate 102 when the shaft 118 is rotated about the central axis 120. The drum 226 is at least partially disposed inside the air gap 116 between the coil assembly 112 and the magnet assembly 114. The drum 226 can be manufactured as will be described below with reference to FIGS. 16-26.

Referring now to FIG. 4, the base plate 102 can be of any suitable shape, and in some embodiments, may define a substantially disk-shaped surface 132 which is substantially flat. The surface 132 has a center 134, an aperture 136 may be located at the center 134, a first set of apertures 138, and a second set of apertures 140. Only some of the apertures 138 and 140 are referenced in FIG. 4, for purposes of clarity.

The first set of apertures 138 are arranged along the surface 132 in such a way as to define four concentric rings 144a-d of proportionately increasing radius, and are aligned as to form six radial lines 142 separated by about 60°.

The second set of apertures 140 can be arranged along the surface 132 in such a way as to define two concentric rings—146a-b, and arranged to form six radial lines 148, which may be offset by about 30° from the radial lines 142 defined by the first set of apertures 138. The apertures 138 can be adapted to receive the base bolts 108, in order to affix the interference drum assembly 106 and the flux assembly 104a to the base plate 102. The base plate 102 can be made from a thermoset plastic laminate material such as a material of the type sold under the name Garolite G-10, but acrylic plastics such as Plexiglas™, or any other material of suitable strength and durability can be used. The base plate 102 may be made of non-conductive and/or non-ferrous materials to limit the potential of eddy currents being induced within the generator assembly 100. The disk-shaped surface 132 of the base plate 102 may be about 24 inches in diameter, but it is to be understood that the dimensions of the base plate 102 can be varied depending on the material used for the manufacture of the base plate 102 and/or the operational and environmental variables expected to be encountered by the generator assembly 100.

The base plate 102 can function to structurally support the various components of the generator assembly 100. The shape, size, organization, and number of apertures 138 and 140 can vary. The aperture 136 is adapted to receive the shaft 118 therethrough. The base plate 102 can define a part of an external housing (not shown) protecting the generator assembly 100 from environmental variables. Alternatively, the generator assembly 100 can be completely or partially enclosed by a separate protective housing, such as the generator assembly housing 58 shown in FIG. 1, for example. It should be understood that the base plate 102 can have any size or shape, as long as it allows for the concentric radial orientation of the interference drum assembly 106, the magnet assembly 114, and the coil assembly 112 along the surface 132 of the base plate 102.

Referring now to FIGS. 5A-5B, in some embodiments, the flux base 110 may be made from a thermoset plastic laminate material, such as a material of the type sold under the name Garolite G-10, and known generically as FR4, but any material of suitable strength and durability can be used. The flux base 110 may be made of non-conductive and/or non-ferrous materials to limit the potential of eddy currents being induced within the generator assembly 100. The flux base 110 may be about 1 inch thick, but it is to be understood that the dimensions of the flux base 110 can be varied depending on the material used for its manufacture and/or the operational and environmental variables expected to be encountered by the generator assembly 100.

The flux base 110 may have an elongated shape, a first end 150, a second end 152, a notched middle portion 154, and a bottom 156. The bottom 156 may have four base apertures 158 adapted to threadingly receive four base bolts 108 therein, in order to mount the flux base 110 onto the base plate 102. The bottom 156 of the flux base 110 may have a substantially flat rectangular surface to ensure that the flux base 110 fits flush with the surface 132 of the base plate 102, such that the flux base 110 is extending substantially vertically from the surface 132 of the base plate 102 although other configurations can be used. It is to be understood that the flux base 110 can be attached to the surface 132 by any suitable means known in the art, such as screws, rivets, welds, adhesives, and combinations thereof, for example. Alternatively, the flux base 110 and the base plate 102 may be formed as a single piece, or another element (not shown) may be used to connect the flux base 110 to the base plate 102. The flux base 110 may also have mounting apertures 160 cut or otherwise formed into the flat surfaces of its first end 150 and its second end 152. The apertures 160 may be arranged in a substantially rectangular orientation, and are substantially perpendicular relative to the base apertures 158. The apertures 160 function to allow for the attachment of the magnet assembly 114 and the coil assembly 112 to the flux base 110.

Figure 6:
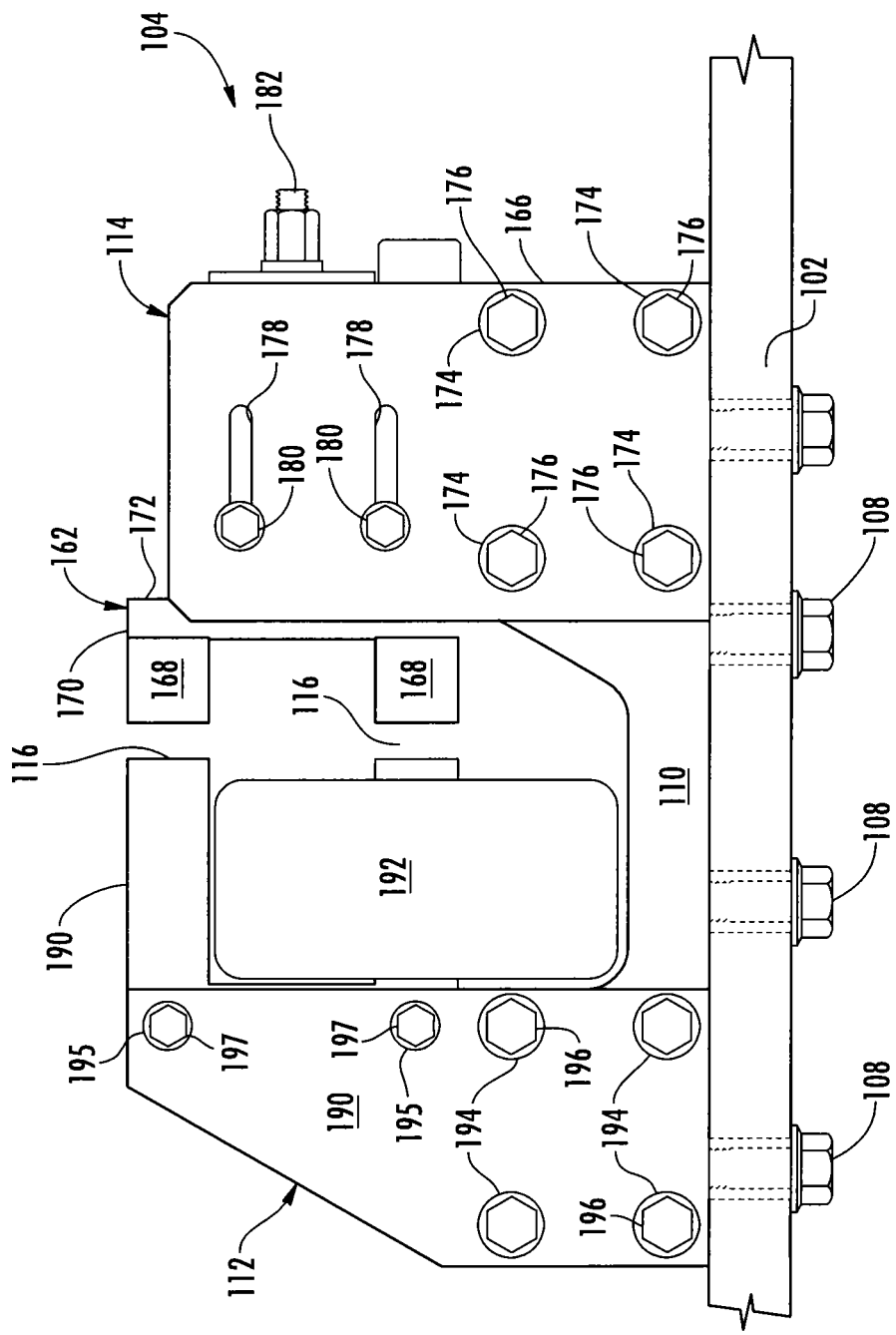
FIG. 6 is a side view of a flux assembly on the generator shown in FIG. 2.

Referring now to FIG. 6, the flux assembly 104a comprises a coil assembly 112, and a magnet assembly 114.

The coil assembly 112 has a coil mount 190, and a coil 192. The coil 192 can have two mounting apertures 195 used to mount the coil 192 onto the coil mount 190. The coil mount 190 has apertures 194 adapted to substantially align with the apertures 160 of the flux base 110. The coil mount 190 can be mounted onto the flux base 110 by inserting bolts 196 through apertures 194 and mounting apertures 160. The coil mount 190 may also have two mounting apertures 195 cut or otherwise formed therein, the mounting apertures 195 adapted to correspond with mounting apertures 160, and receive bolts 197 to secure the coil 192 to the coil mount 190. The coil 192 can be any conventional coil 192 and can have any type or number of windings, cores, and/or poles, as long as the coil 192 is capable of receiving a magnetic flux from the magnet 172, such that electrons from the coil 192 are forced to flow through an electrical circuit (not shown) which may be external to the coil 192.

Figure 7:
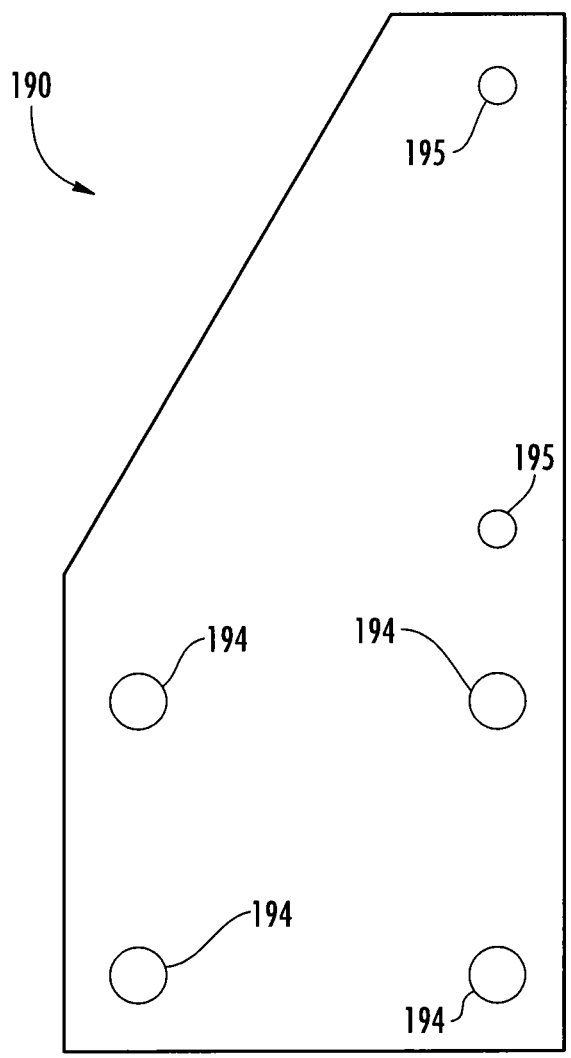
FIG. 7 is a side view of a coil mount of the generator shown in FIG. 2.
Figure 8:
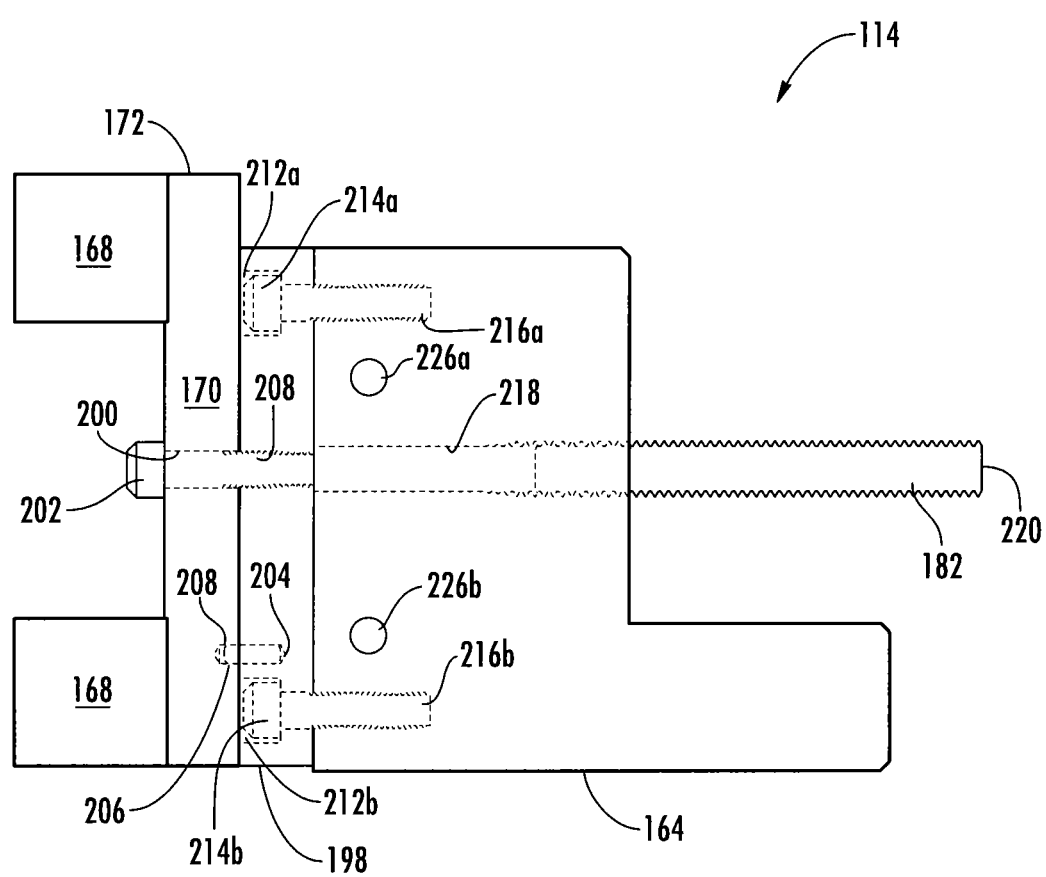
FIG. 8 is a side view of a magnet assembly of the generator shown in FIG. 2.

Referring now to FIG. 7, the coil mount 190 may be about 0.5 inches thick, but it is to be understood that the dimensions of the coil mount 190 can be varied depending on the material used for its manufacture and/or the operational and environmental variables expected to be encountered by the generator assembly 100. The coil mount 190 functions to structurally attach the coil assembly 112 to the flux base 110 via the apertures 194. The coil mount 190 can be directly attached to the flux base 110 via bolts, nuts, screws, welds, adhesives, or by any other suitable means, for example. The coil mount 190 may be made from a material of the type sold under the name Garolite G-10, but any material of suitable strength and durability, and may be non-conductive and/or non-ferrous material(s) to limit the potential of eddy currents being induced within the generator assembly 100, can be used. The coil mount 190 can mount onto the flux base 110 in a fixed position. Alternatively, the coil mount 190 can mount onto the flux base 110 in an adjustable position, by using slots which allow the coil mount 190 to slide relative to the flux base 110, for example.

Referring now to FIGS. 8-11, the magnet assembly 114 may have a magnet 162, a magnet slide 164, a magnet mount 166, and an optional magnet bracket 198.

The magnet 162 may include a pair of magnets 168, connected with a magnetically-conductive bar 170, such that they form a unitary magnet 172. The magnets 168 can be any magnets, can be made of any suitable material, and can be isotropic or anisotropic and combinations thereof. The magnets 168 can be of any strength, and can have varying sizes and shapes depending on the size and output requirements of the generator assembly 100. The magnets 168 can be arranged in any configuration consistent with defining as least a part of an air gap 116 between the magnet assembly 114 and the coil assembly 112, and may be in magnetic communication with the coil assembly 112. The magnets 168 may be permanent magnets, electromagnets, and combinations thereof. The pair of magnets 168 may be connected via a bar 170, such that a unitary magnet 172 is formed. The bar 170 may be made of steel, but can be made of any suitable material so long as it functions to connect the two magnets 168 into a unitary magnet 172. Alternatively, the magnet 172 can comprise a single magnet (not shown). The bar 170 can have a central aperture 200 formed therethrough, the central aperture 200 adapted to receive a bolt 202. The bar 170 also may have a dowel pin aperture 204 adapted to partially receive a dowel pin 206.

Referring now to FIGS. 9A-9B, the magnet assembly 114 further comprises a magnet slide 164, to which the optional magnet bracket 198 can be attached via bolts 214a and 214b, or by other suitable means as will be described below. The magnet slide 164 may include two apertures 216a and 216b formed therethrough, the apertures 216a and 216b having threads formed therein. The apertures 216a and 216b can be adapted to receive bolts 214a and 214b in order to secure the magnet bracket 198 to the magnet slide 164. The magnet slide 164 also may have a central aperture 218 cut or otherwise formed therethrough. The central aperture 218 is adapted to receive any portion of a bolt 202 which extends beyond the magnet bracket 198 as will be described below. The central aperture 218 may also be designed to receive and retain therein the slide adjustment rod 182. The slide adjustment rod 182 may be made of an acrylic plastic material such as Plexiglas™ for example, or any material of suitable strength and durability, and non-conductive and/or non-ferrous material(s), for example, to limit the potential of eddy currents being induced within the generator assembly 100, can be used. The slide adjustment rod 182 can be secured inside the central aperture 218 by the use of epoxy, epoxy resins, or other suitable adhesives, for example. The slide adjustment rod 182 may have a threaded end 220 which extends at least partially laterally from the magnet mount 166, such that a slide adjustment washer 222 and adjustment nut 224 can be attached to the threaded end 220 of the slide adjustment rod 182. The slide adjustment washer 222 can rest against the magnet bracket 198. A spring (not shown) may be inserted over the slide adjustment rod 182, or any other suitable means may be used to keep the slide adjustment washer 222 pressed against the magnet bracket 198. The magnet slide 164 may also have two or more apertures 226a and 226b formed therethrough, which apertures 226a and 226b may be substantially perpendicular to the apertures 216a and 216b.

The magnet slide 164 may be made of 1 inch thick thermoset plastic laminate material such as the material sold under the name Garolite G-10 or FR4, but acrylic plastics such as Plexiglas™, epoxy resins, or any material of suitable strength and durability, and may include non-conductive and/or non-ferrous material(s) to limit the potential of eddy currents being induced within the generator assembly 100, can be used. Additionally, the magnet slide 164 can have any suitable thickness, size, or shape, so long as the magnet slide 164 is capable of supporting the magnet 172, and may be capable of slidably adjusting the position of magnet 172 relative to the flux base 110 and the coil assembly 112, in order to adjust the size of the air gap 116. The magnet slide 164 can be mounted onto the flux base 110 by inserting lockdown bolts 180 through the adjustment slots 178a and 178b of the magnet mount 166 and into apertures 226a and 226b respectively. The position of the magnet slide 164 can be adjusted by tightening or loosening the adjustment nut 224, which results in the sliding of the lockdown bolts 180 into the adjustment slots 178a and 178b, in order to move the magnet slide 164 relative to the magnet mount 166, and thereby the flux base 110 and the coil assembly 112. To secure the magnet slide 164 in position, the lockdown bolts 180 can be tightened.

Figure 10A:
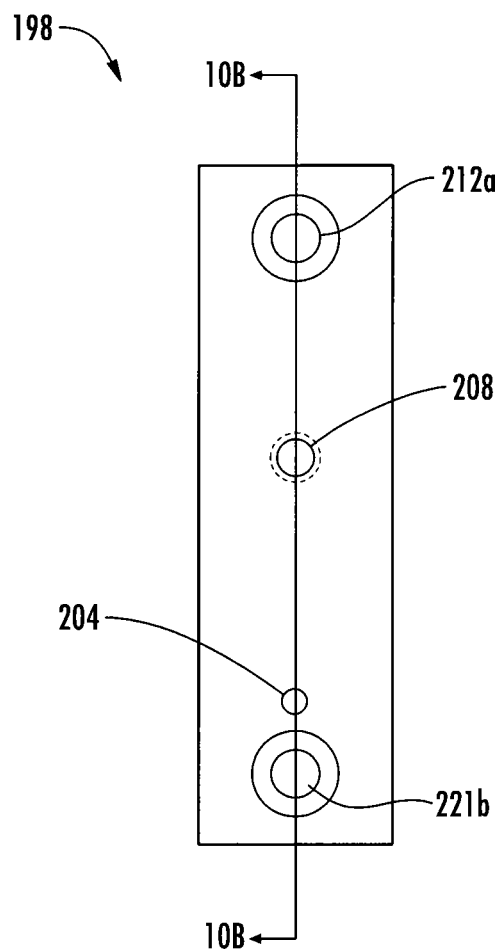
FIG. 10A is a front view of a magnet bracket of the magnet assembly shown in FIG. 8.
Figure 10B:
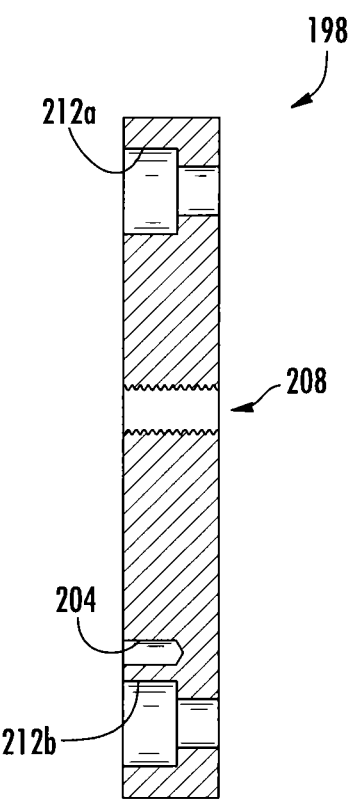
FIG. 10B is a cross-sectional view taken along line 10B-10B of FIG. 10A.

Referring now to FIGS. 10A-10B, the optional magnet bracket 198 can be substantially rectangular in shape and may have substantially flat surfaces. The magnet bracket 198 can have two mounting apertures 212a and 212b, a central aperture 208, and a dowel pin aperture 204. The dowel pin aperture 204 may be adapted to at least partially receive the dowel pin 206, such that the dowel pin 206 and the bolt 202 engage the magnet 172 and the magnet bracket 198, in order to prevent rotation of the magnet 172 and the magnet bracket 198 relative to one another. It is to be understood, however, that any other suitable means can be used to secure the magnet 172 and the magnet bracket 198 together, such as a plurality of dowel pins, a plurality of bolts, one or more of: screws, rivets, welds, or adhesives, for example. The magnet bracket 198 also may have a lateral pair of apertures 212*a* and 212*b* cut or otherwise formed therethrough, the apertures 212*a* and 212*b* can be adapted to receive bolts 214*a* and 214*b* respectively. The magnet bracket 198 may be made of aluminum, for example, but it is to be understood than any material of suitable strength and durability, and non-conductive and/or non-ferrous material(s) to limit the potential of eddy currents being induced within the generator assembly 100 can be used. The magnet bracket 198 can have various shapes and sizes as long as it functions to connect the magnet 172 to the magnet slide 164. Alternatively, a magnet bracket 198 can be omitted, and the magnet 172 can be directly connected to the magnet slide 164.

Figure 11:
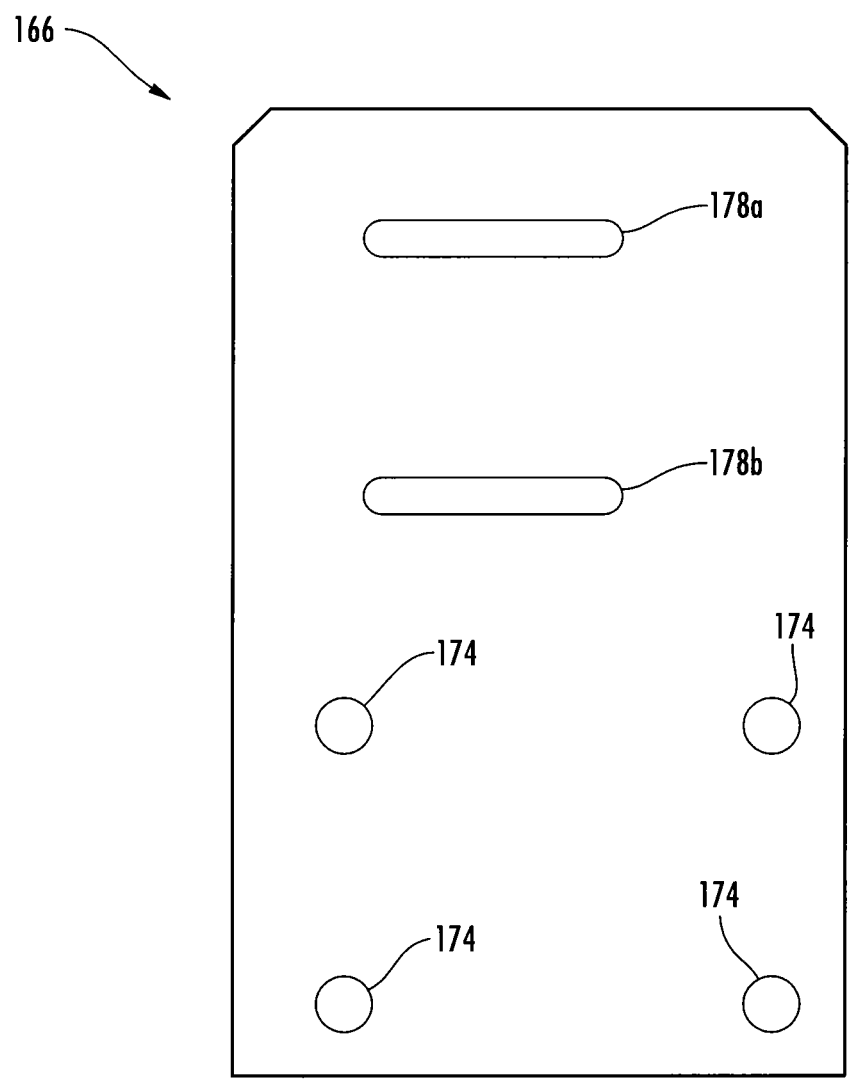
FIG. 11 is a front view of a magnet mount of the magnet assembly shown in FIG. 8.
Figure 13B:
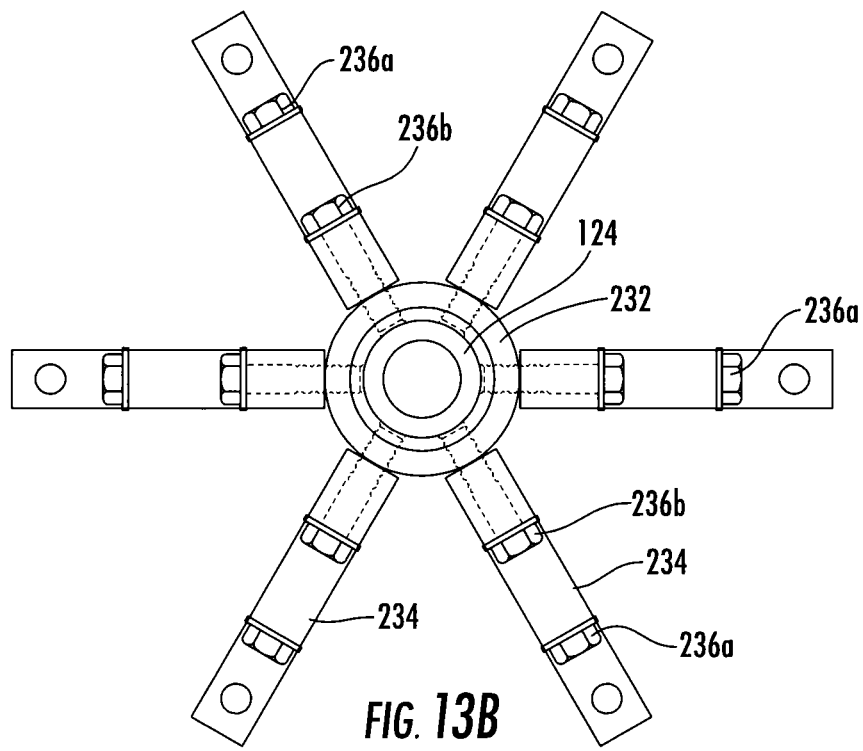
FIG. 13B is a top plan view of the shaft support assembly shown in FIG. 13A.
Figure 13A:
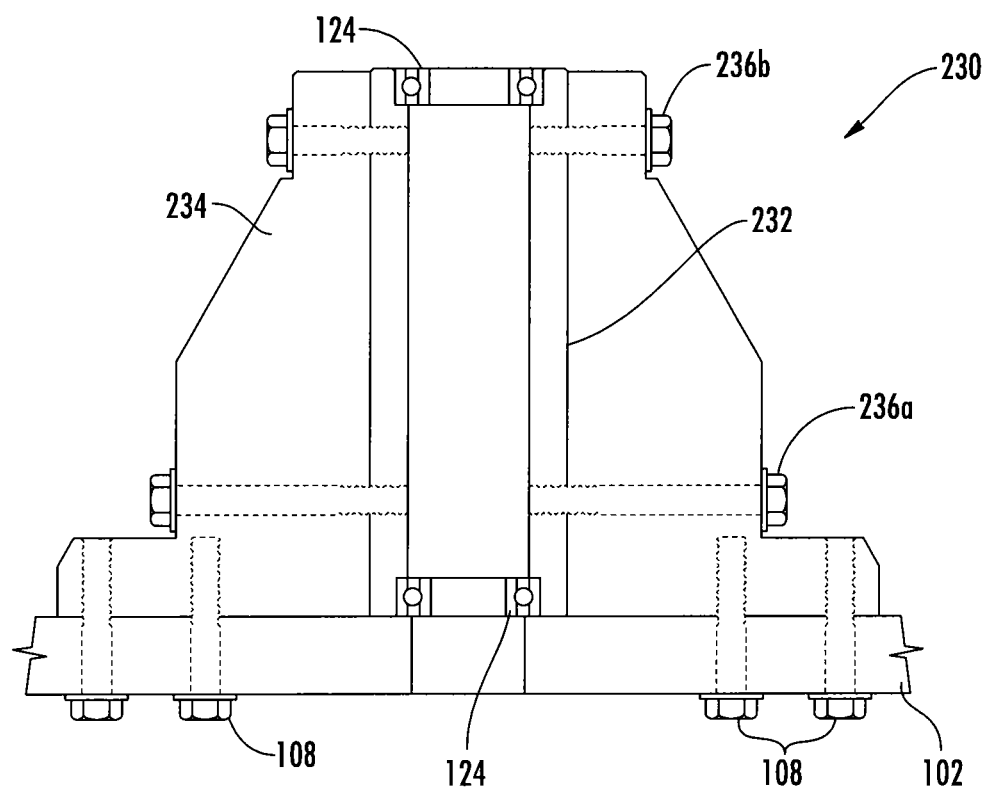
FIG. 13A is a side view of a shaft support assembly of the generator shown in FIG. 2.

Referring now to FIG. 11, the magnet mount 166 may be substantially rectangular in shape and may be made of a thermoset plastic laminate material such as a material of the type sold under the name Garolite G-10 or FR4, but acrylic plastics such as Plexiglas™, epoxy resins, or any material of suitable strength and durability, and may be non-conductive and/or non-ferrous material(s) to limit the potential of eddy currents being induced within the generator assembly 100 can be used. The magnet mount 166 may have four or more mounting apertures 174 which are spaced to substantially align with mounting apertures 160 of the flux base 110. The magnet mount 166 may mount onto the flux base 110 by inserting bolts (not shown) through the corresponding mounting apertures 174 and mounting apertures 160. The magnet mount 166 may also have two adjustment slots 178*a* and 178*b* cut therein. The adjustment slots 178*a* and 178*b* can correspond to apertures 212*a* and 212*b* of the magnet slide 164. The adjustment slots 178*a* and 178*b* may function to allow lockdown bolts 180 (not shown) to be inserted through the adjustment slots 178*a* and 178*b* and the apertures 212*a* and 212*b*, and allow the lockdown bolts 180 to slide inside the adjustment slots 178*a* and 178*b*, in order for the magnet slide 164 to be slidably adjustable relative to the magnet mount 166. As the coil assembly 112 is mounted on the flux base 110, the magnet slide 164 is mounted onto the magnet mount 166, and the size of the air gap 116 can be adjusted by sliding the magnet slide 164 relative to the magnet mount 166. Once the magnet slide 164 is in the desired position, the magnet slide 164 can be secured by tightening the lockdown bolts 180.

Referring now to FIGS. 12-14C, the interference drum assembly 106 may have a shaft 118, a cylindrical drum 226, and a hub 130 connecting the drum 226 to the shaft 118, so as to allow the drum 226 to rotate when the shaft 118 is rotated. The shaft 118 can be housed inside a shaft housing 230, which may be mounted onto the base plate 102. The shaft housing 230 may comprise a bearing tube 232, shaft bearings 124, a gusset 234, long gusset bolts 236*a*, and short gusset bolts 236*b*. The shaft housing 230 may be mounted onto the base plate 102 via base bolts 108, such that the shaft housing 230 is substantially centered over the central aperture 136 of the base plate 102, and the shaft 118 extends through the central aperture 136 of the base plate 102. The bearing tube 232 can be substantially cylindrical in shape, and may have a first row of apertures 240*a* and a second vertically offset set of apertures 240*b* cut or otherwise formed therethrough. The apertures 240*a* and 240*b* have threads formed into them and are adapted to receive long gusset bolts 236*a* and short gusset bolts 236*b* therein respectively. The apertures 240*a* and 240*b* can be substantially perpendicular to the longitudinal axis of the bearing tube 232.

The bearing tube 232 may also have two or more annular recesses 246 formed in the bottom and top end thereof. The two annular recesses 246 can be adapted to receive and retain annular shaft bearings 124 therein. The shaft bearings 124 can cooperate with the bearing tube 232 to rotatably secure and house the shaft 118, and ensure smooth rotation of the shaft 118 about its central axis 120. The apertures 240 can be diametrically opposed along the cylindrical surface of the bearing tube 232. The bearing tube 232 may be made of a thermoset plastic laminate material such as a material of the type sold under the name Garolite G-10 or FR4, but acrylic plastics such as Plexiglas™, epoxy resins, or any material of suitable strength and durability, and may be non-conductive and/or non-ferrous material(s) to limit the potential of eddy currents being induced within the generator assembly 100 can be used.

Figure 15C:
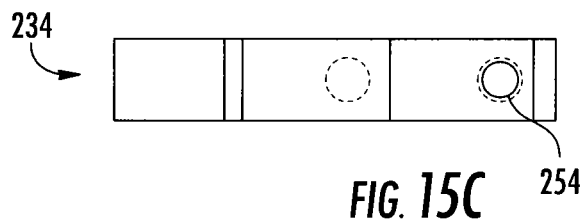
FIG. 15C is a top plan view of the gusset shown in FIG. 15A.
Figure 15A:
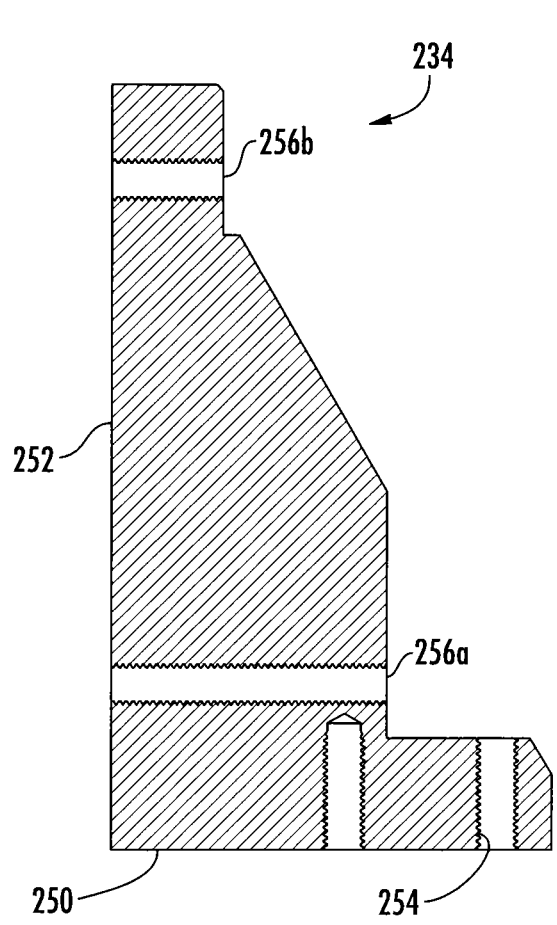
FIG. 15A is an end view of the gusset shown in FIG. 13A.
Figure 15B:
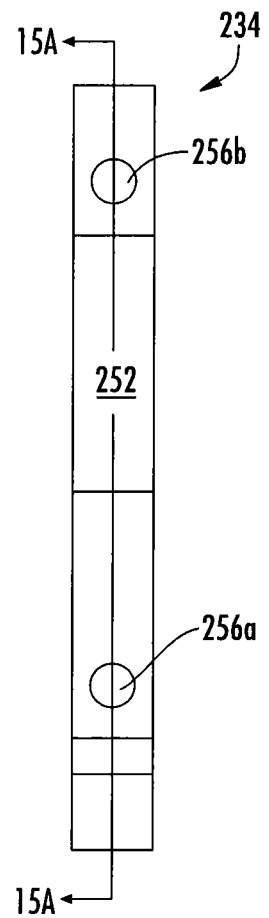
FIG. 15B is a cross-sectional view along line 15B-15B of FIG. 15A.

Referring now to FIGS. 15A-15C, the gusset 234 can have a bottom surface 250 and a bearing tube surface 252 substantially perpendicular to the surface 132. The bottom surface 250 has two apertures 254 formed therein. The apertures 254 may have threads formed therein, and may be adapted to receive base bolts 108 in order to mount the gusset 234 onto the base plate 102. The bearing tube surface 252 can have two or more apertures 256*a* and 256*b* cut or otherwise formed therein. The apertures 256 can be adapted to receive long gusset bolts 236*a* and short gusset bolts 236*b* respectively therethrough in order to secure the bearing tube 232 to the gusset 234. Several gussets 234 can be secured to the bearing tube 232 in order for the bearing tube surfaces 252 of the gussets 234 to support the bearing tube 232 in a substantially perpendicular orientation relative to the base plate 102.

The number of gussets 234 mounted to the bearing tube 232 can be as low as one, and can be any odd or even number depending on the sizes of the bearing tube 232 and gussets 234. When an even number of gussets 234 is used, the gussets 234 may be mounted on the bearing tube 232 in diametrically opposed locations. When an odd number of gussets 234 is used, the gussets 234 may be disposed at regular intervals along the cylindrical surface of bearing tube 232, such that the distances between any two gussets 234 is substantially the same as the distance between any other two gussets 234. Alternatively, the gusset 234 can be omitted and the bearing tube 232 can be secured to the base plate 102 by any conventional means known in the art. The bearing tube 232 may be welded to the base plate 102 for example. Alternatively, the bearing tube 232 and the base plate 102 may be formed as a unitary body.

The gusset 234 may be made of a thermoset plastic laminate material such as the type of material sold under the name Garolite G-10 or FR4, but acrylic plastics such as Plexiglas™, epoxy resin, or any material of suitable strength and durability, and may be non-conductive and/or non-ferrous material(s) to limit the potential of eddy currents being induced within the generator assembly 100 can be used.

Figure 16:
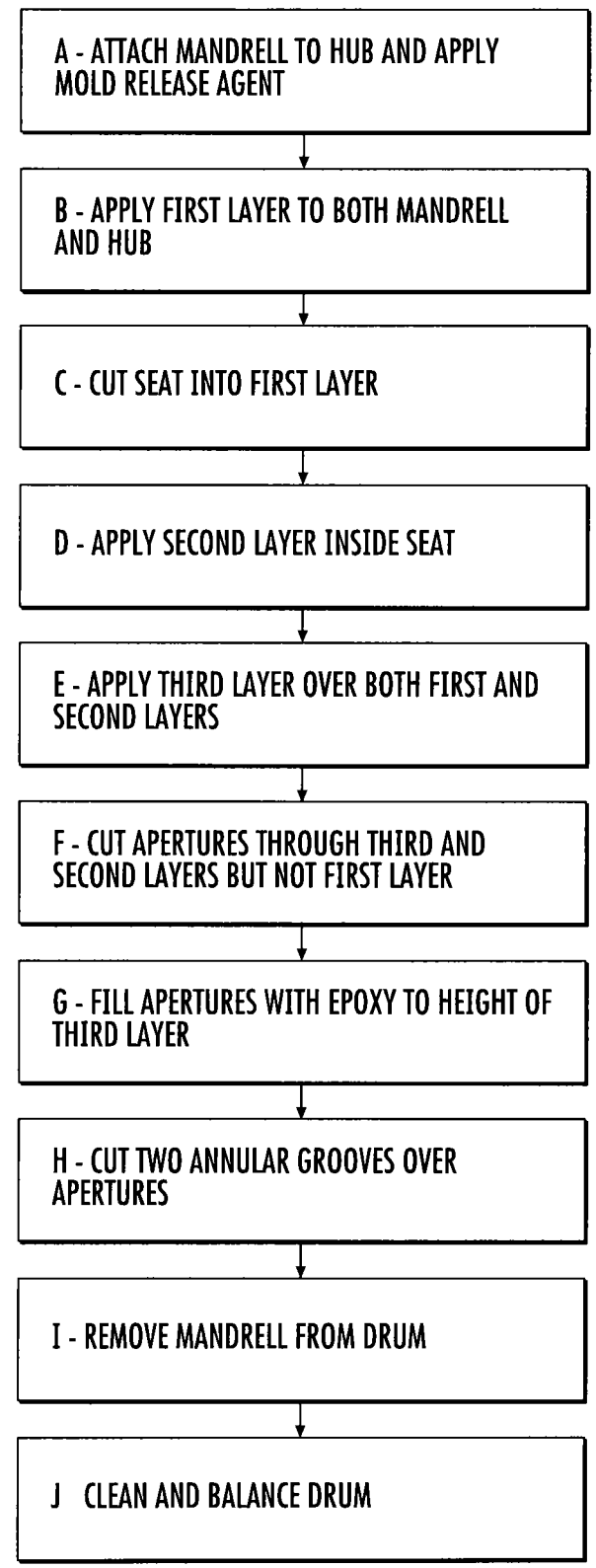
FIG. 16 is a flow diagram of steps of an embodiment of a method for manufacturing an interference drum for a generator of electrical energy according to the inventive concepts disclosed herein.

Referring now to FIG. 16, the preferred method 600 of manufacturing the drum 226 of the generator assembly 100 shown in FIG. 2 comprises steps 602-620, which will be discussed in detail below.

Figure 17A:
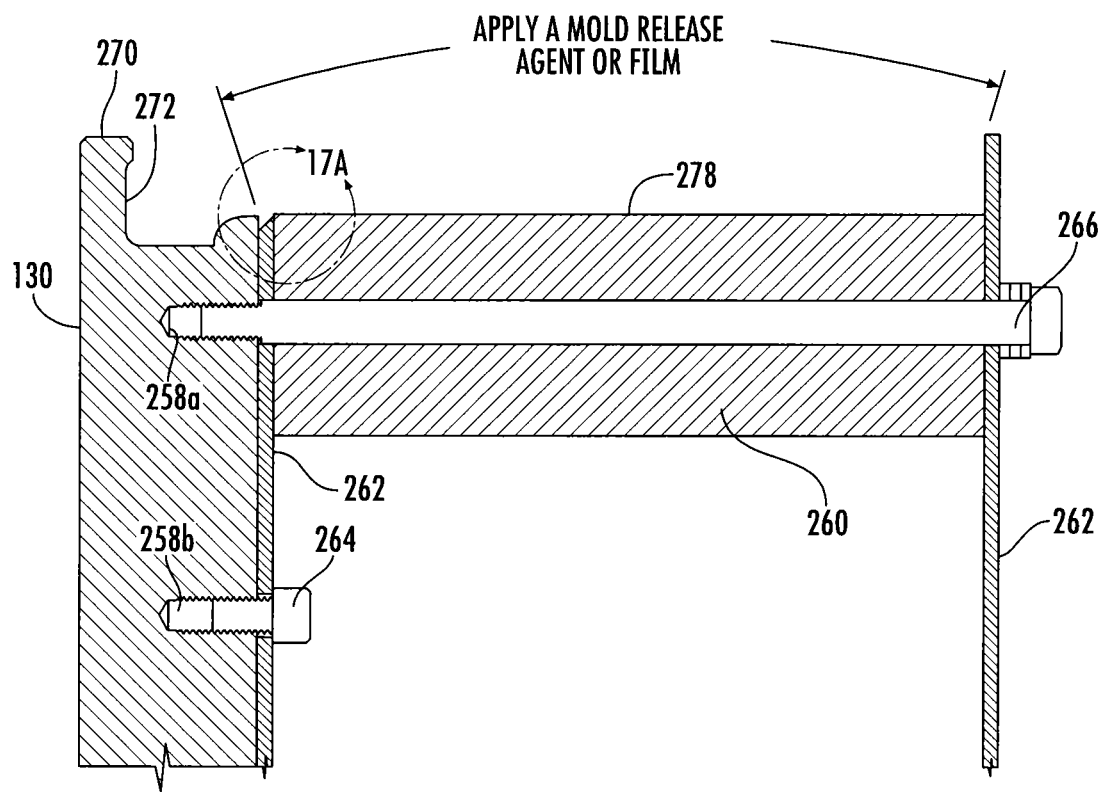
FIG. 17A is a partial cross-sectional view of a mandrel attached to a hub in accordance with step 602 of the flow diagram shown in FIG. 16.
Figure 17B:
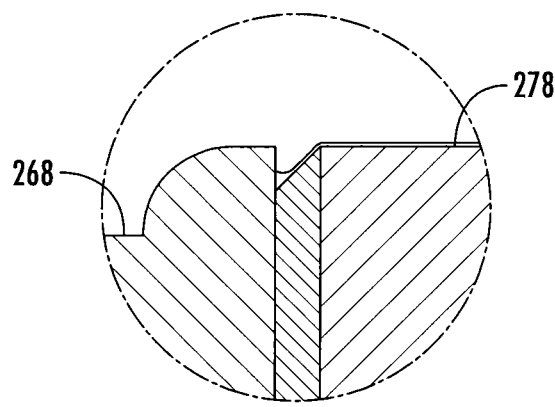
FIG. 17B is a fragmental view along line 17B of FIG. 17A.

Referring now to FIGS. 17A-17B, step 602 comprises attaching a hub 130 to a mandrel 260. The hub 130 is shown as having two apertures 258*a* and 258*b*. The apertures 258*a* and 258*b* include threads formed into them. The mandrel 260 may have two disk-shaped sides 262 attached thereto, and is shown attached to the hub 130 via the insertion of a long bolt 266 and a short bolt 264 into apertures 258a and 258b respectively. The hub 130 may be disk shaped and may have a flat surface 268 and an axial surface 270. An annular recess 272 may be formed in the axial surface 270 of the hub 130. The annular recess 272 functions to provide structural support for the various layers of the cylindrical sidewall 276 of the drum 226. The hub 130 can be made of any suitable material, such as a thermoset plastic laminate material such as the type of material sold under the name Garolite G-10 or FR4, but acrylic plastics such as Plexiglas™, or any material of suitable strength and durability may be used. The hub 130 may be made of non-conductive and/or non-ferrous materials to limit the potential of eddy currents being induced within the generator assembly 100. The mandrel 260 may have a substantially cylindrical external surface 278.

A mold release agent, or film, is applied onto the surface 278, but not onto the hub 130. The mold release agent, or film, can be any conventional mold release agent or film known in the art, such as wax-based mold release agents, water-based mold release agents, silicone-based mold release agents, Teflon® based mold release agents, and combinations thereof, for example. The mold release agent functions to later separate the finished cylindrical sidewall 276 from the mandrel 260, while at the same time allowing the cylindrical sidewall 276 to remain attached to the hub 130. The mandrel 260 can be made from any material that is able to hold its shape during manufacture, machining, and disassembly/reassembly, such as aircraft-grade aluminum, for example, or other metals, as well as non-metals.

Figure 18B:
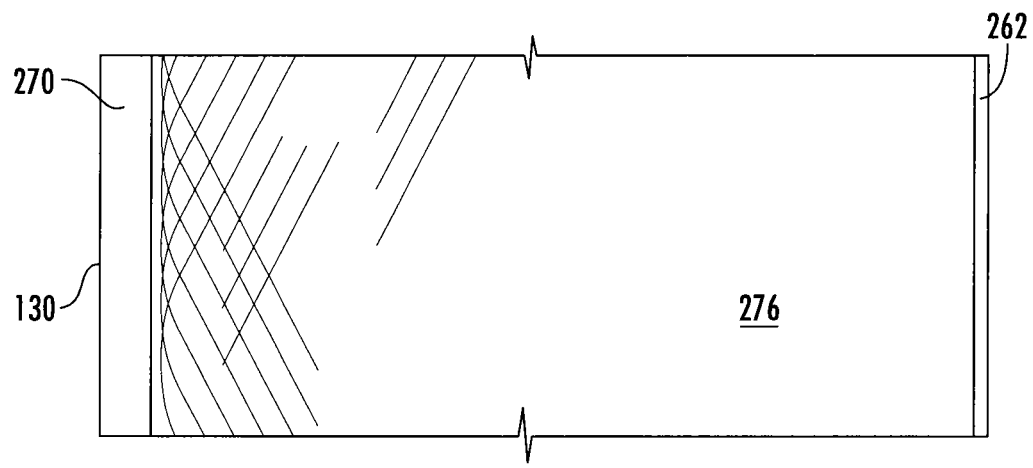
FIG. 18B is a partial top plan of the external axial surface of the first layer of material shown in FIG. 18A.
Figure 18A:
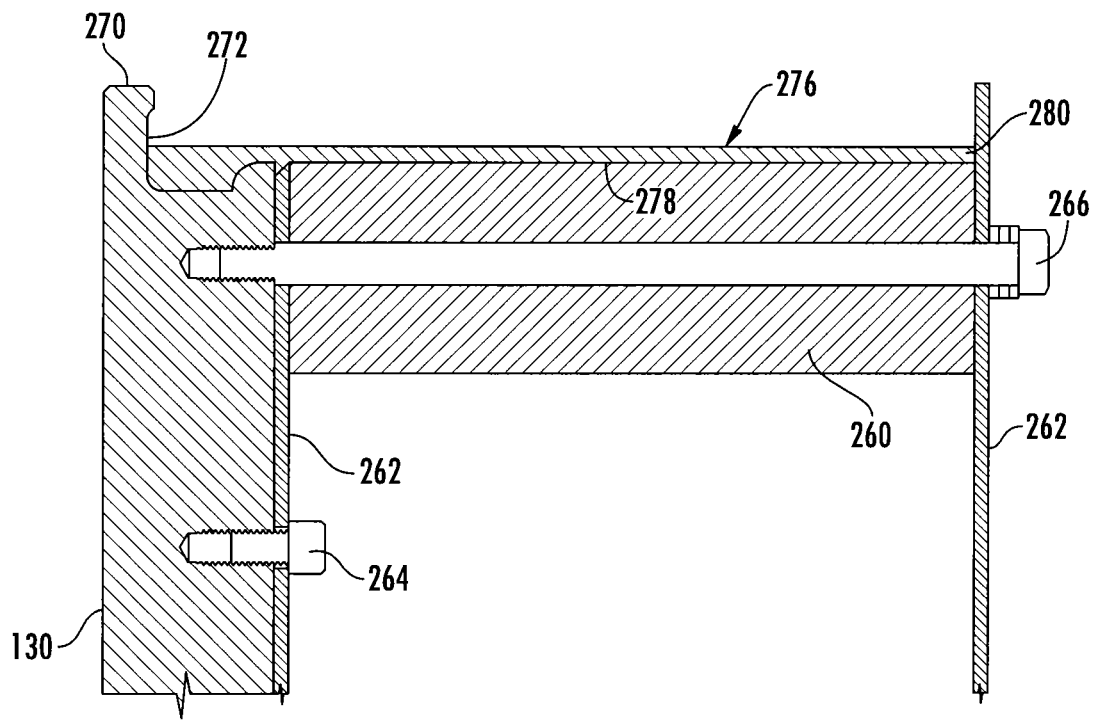
FIG. 18A is a partial cross-sectional view of a first layer of material applied to the hub and mandrel according to step 604 of the flow diagram shown in FIG. 16.

Referring now to FIGS. 18A-18B, step 604 comprises building up a first layer 280 of epoxy-based fiberglass on top of the surface 278 and into the annular recess 272. The first layer 280 may be a substantially uniform thickness of about 0.157 inches over the surface 278 of the mandrel 260, and may have a different thickness over the annular recess 272. It is to be understood, however, that the first layer 280 can have varying thicknesses and more than two portions with different thickness, as required by the size of the drum 226 and the expected operational variables for the generator assembly 100. The first layer 280 may be made of epoxy-based fiberglass, but any other suitable material can be used as is known in the art. The first layer 280 is the innermost layer of the cylindrical sidewall 276 of the drum 226, and may function to provide structural support to the remaining layers of the cylindrical sidewall 276.

Figure 19B:
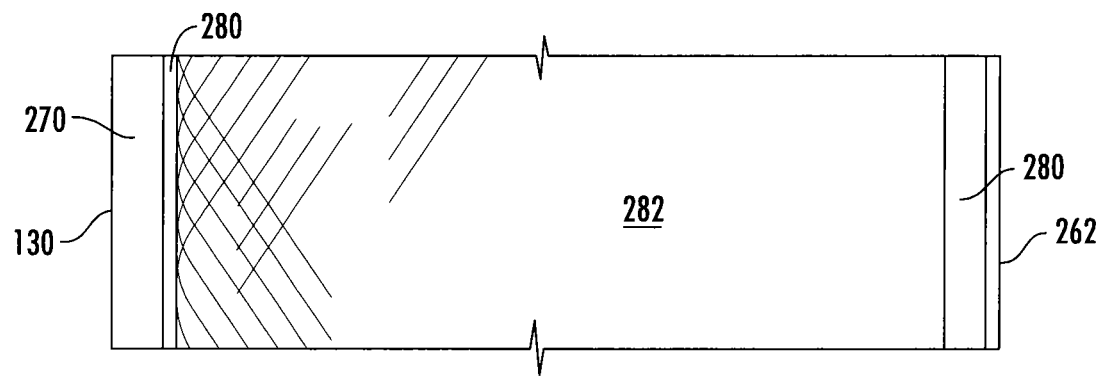
FIG. 19B is a partial top plan view of an external axial surface of the seat shown in FIG. 19A.
Figure 19A:
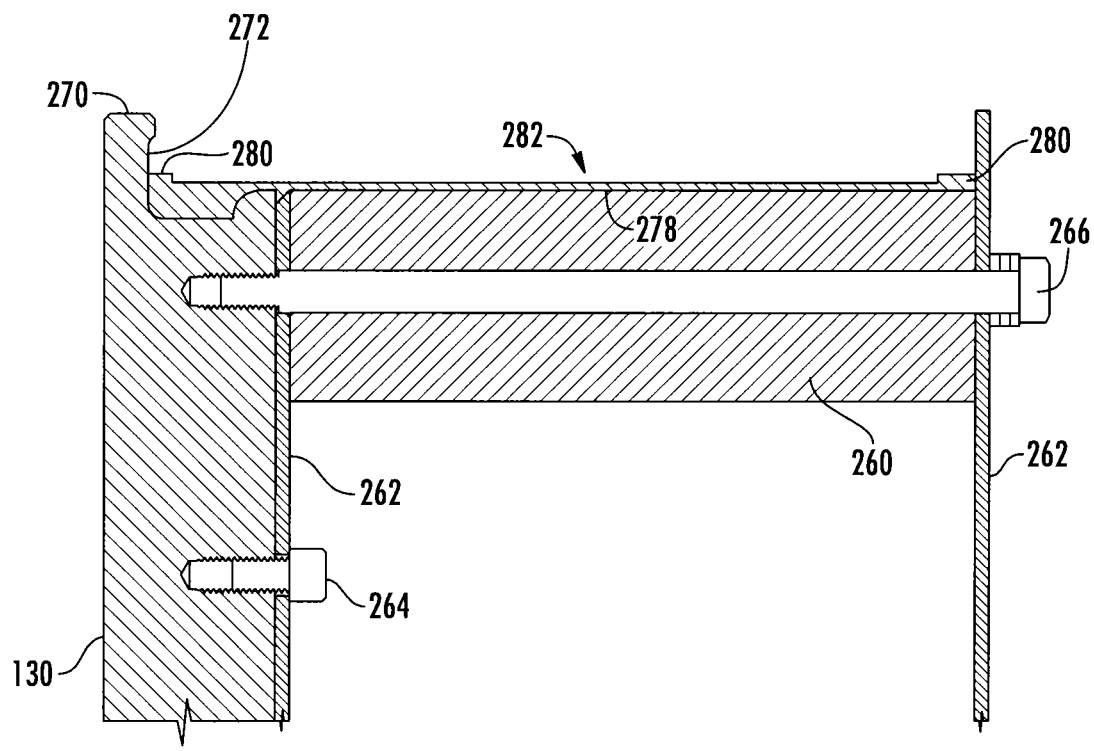
FIG. 19A is a partial cross-sectional view of a seat cut into the first layer of material applied to the hub and mandrel according to step 606 of the diagram shown in FIG. 16.

Referring now to FIGS. 19A-19B, step 606 comprises machining away a seat 282 into the first layer 280. The seat 282 may have a width which extends at least partially over the annular recess 272 and at least partially over the surface 278, and may be of uniform thickness (or depth). It is to be understood however that the seat 282 can have two or more areas of different thickness or depths, and may not extend over the annular recess 272.

Figure 20B:
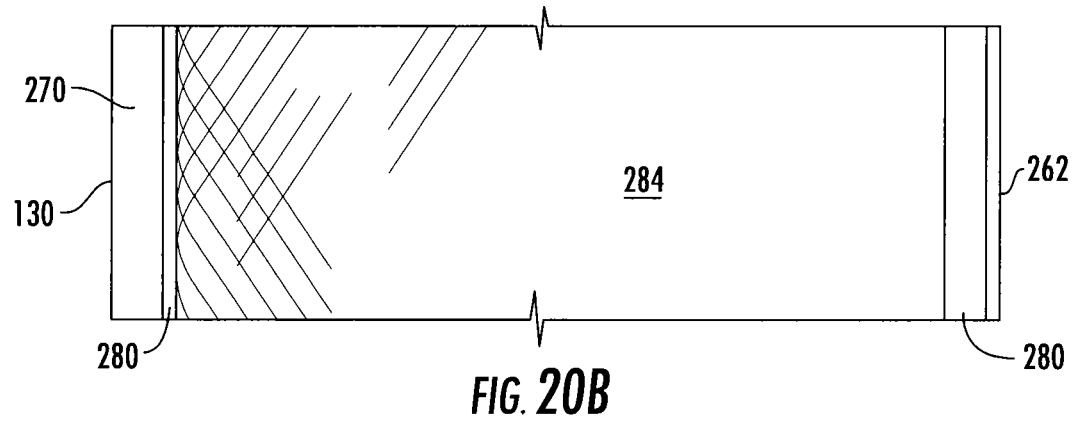
FIG. 20B is a partial top plan view of the second layer of material shown in FIG. 20A.
Figure 20A:
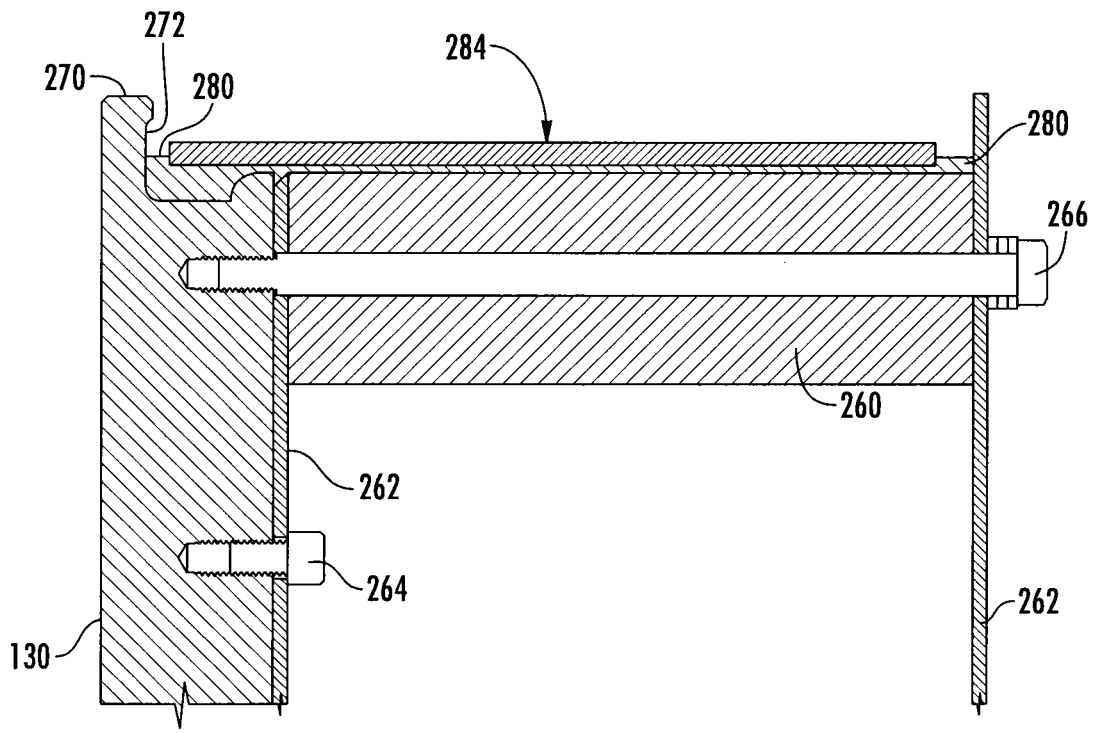
FIG. 20A is a partial cross-sectional view of a second layer of material applied inside the seat in the first layer of material according to step 608 of the flow diagram shown in FIG. 16.

Referring now to FIGS. 20A-20B, step 608 comprises wrapping a second layer 284 of a magnetic shielding film around the first layer 280, such that the width of the second layer 284 may be substantially the same as the width of the seat 282. The second layer 284 can be made of a magnetic shielding film such as the film sold under the trademark Metglas®, and described in Published U.S. patent application Ser. No. 11/320,744. Alternatively, any material that is resistant to becoming permanently magnetized and can redirect a magnetic field can be used to form the second layer 284. In one non-limiting example, one or more suitable amorphous or crystalline metal alloy ribbon, film, or wire having the desired mechanical and electromagnetic properties can be used to make up the second layer 284. The second layer 284 may be about 0.200 inches thick, but its thickness can vary depending of the size of the drum 226, the strength of the magnetic field used, or other operational variables of the generator assembly 100. The second layer 284 functions to create a magnetic field impermeable cylindrical layer 284 of the cylindrical sidewall 276 of the drum 226.

Figure 21B:
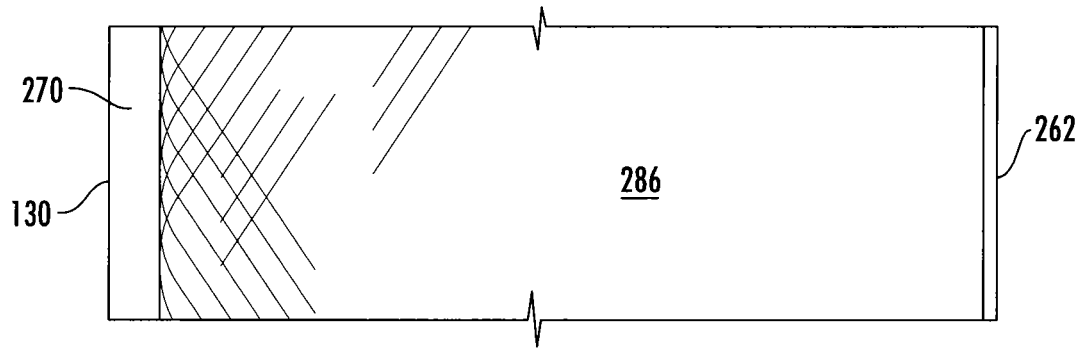
FIG. 21B is a partial top plan view of the external axial surface of the third layer of material shown in FIG. 21A.
Figure 21A:
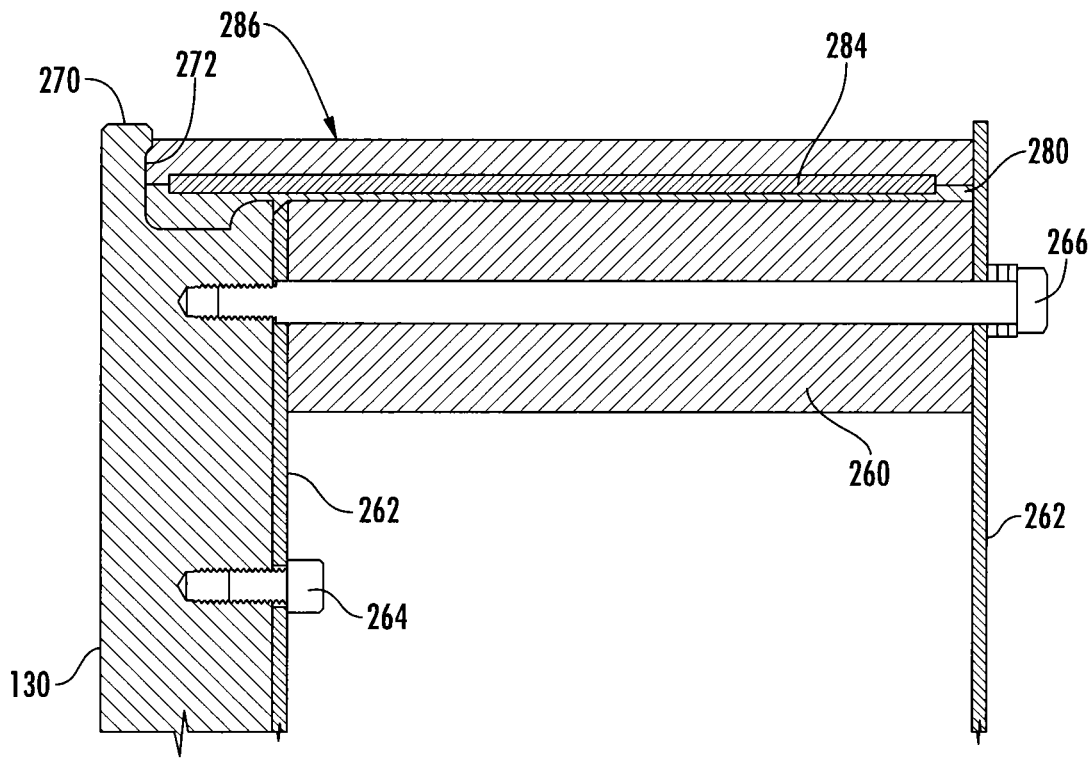
FIG. 21A is a partial cross-sectional view of a third layer of material applied over the first and the second layer of material according to step 610 of the flow diagram shown in FIG. 16.

Referring now to FIGS. 21A-21B, step 610 comprises building up a third layer 286 of epoxy based fiberglass on top of the surface 278 and the lateral surface 270, such that the width of the third layer 286 may be substantially equal to the width of the first layer 280. The third layer 286 may be of a substantially uniform thickness over the second layer 284, and may have a different thickness over the first layer 280. It is to be understood however that the third layer 286 can have varying thicknesses and more than two zones with different thickness, as required by the size of the drum 226 and the expected operational variables for the generator assembly 100. The third layer 286 may be made of epoxy-based fiberglass, but any other suitable material can be used. The third layer 286 may cooperate with the first layer 280 to substantially completely enclose the second layer 284, and to provide structural support to the second layer 284.

Figure 22B:
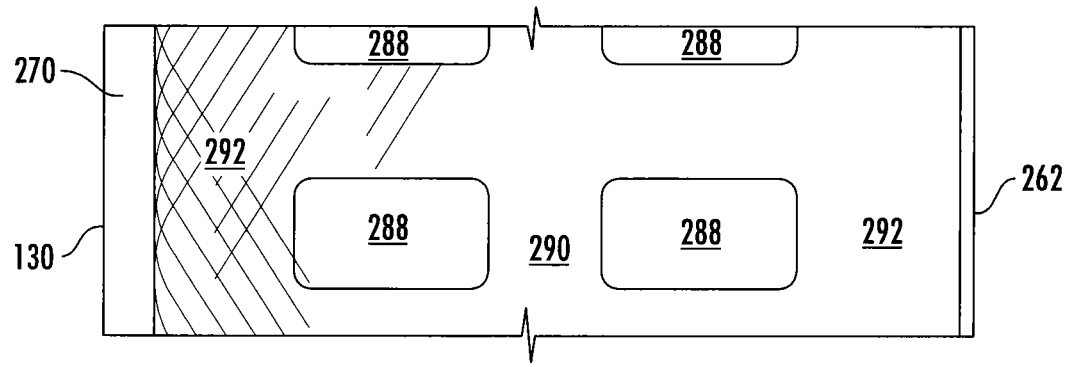
FIG. 22B is a partial top plan view of the external axial surface of the first, second, and third layers of material applied to the hub and mandrel shown in FIG. 22A.
Figure 22A:
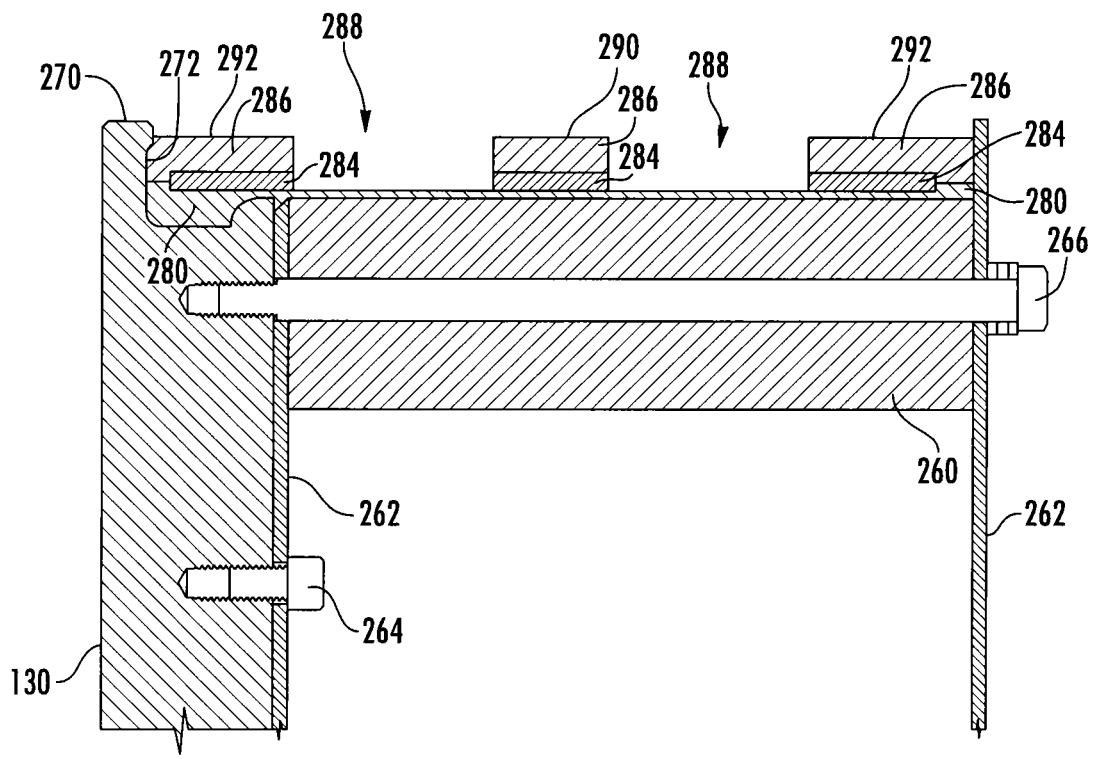
FIG. 22A is a partial cross-sectional view of apertures being cut through the third and second layers of material applied to the hub and mandrel according to step 612 of the flow diagram shown in FIG. 16.

Referring now to FIGS. 22A-22B, step 612 comprises forming magnetic field permeable apertures 288 into the cylindrical sidewall 276. The apertures 288 can be formed by substantially completely cutting through the third layer 286 and the second layer 284, and may partially cut through the first layer 280, for example. In some embodiments, two apertures 288 are formed along a straight axial line on the cylindrical sidewall 276, the two apertures being separated by a middle zone 290, where none of the third layer 286, the second layer 284, and the first layer 280, have been cut through, for example. The two apertures 288 can further define two end zones 292 where no layers have been cut. It is to be understood that only one aperture 288 or more than two apertures 288 may be cut into one or more of the layers of the cylindrical sidewall 276. Further, the apertures 288 may not extend into the first layer 280, so long at the apertures 288 extend substantially completely through the second layer 284. The apertures 288 may be formed by any means known in the art.

The apertures 288 function to create magnetic field permeable zones 294 into the cylindrical sidewall 276. The apertures 288 can be substantially rectangular in shape and can have dimensions of 1 inch by 1.75 inch for example. However, the sizes and shapes of the apertures 288 may be varied without departing from the scope of the inventive concepts disclosed herein.

A second set of apertures 288 may be formed as described above after rotating the mandrel 260 exactly 12° by using an indexing mechanism. In some embodiments, thirty pairs of apertures 288 are cut into the layers of the drum 226, which thirty pairs are spaced 12° apart in order to cover the entire 360° of the cylindrical sidewall 276 of the drum 226. This preferred number and orientations of apertures 288 are related to the preferred number of six flux assemblies 104a as follows: the six flux assemblies 104a are evenly spaced about the cylindrical sidewall 276 of the drum 226, resulting in a 60° of separation between the flux assemblies 104a. Each aperture 288 defines a magnetic field permeable zone 294 along the cylindrical sidewall 276 of the drum 226. The remaining zones 296 are magnetic field impermeable due to the second layer 284.

In order to balance the pull of the magnets 172 onto the magnetic field impermeable zones 296 and avoid wobble, the number of pairs of apertures 288 may be divisible by both 2 and 3, in order to ensure that the pairs of apertures 288 are positioned such that any two diametrically opposed pairs of flux assemblies 104 may be either simultaneously aligned with an aperture 288, or are simultaneously aligned with a magnetic field impermeable zone 296, in some embodiments. Other suitable numbers of pairs of apertures could be: thirty-six (spaced 10° apart), twenty-four (spaced 15° apart), eighteen (spaced 20° apart), twelve (spaced 30° apart), or six (spaced 60° apart), for example. It should be appreciated that if a number of flux assemblies 104a different than six is used, a different relationship between the number of flux assemblies 104a and the number or apertures 288 may be used. The calculation of the relationship between the number of flux assemblies 104a and the number of apertures 288 would be routine for a person skilled in the art having the benefit of the instant disclosure.

It is to be understood that the number of apertures 288 may be varied along with the shape and size of the apertures 288, and the distance in degrees between the several pairs of apertures 288. It is also to be understood that a single pair of apertures 288 may be used in some exemplary embodiments of the inventive concepts disclosed herein.

Figure 23B:
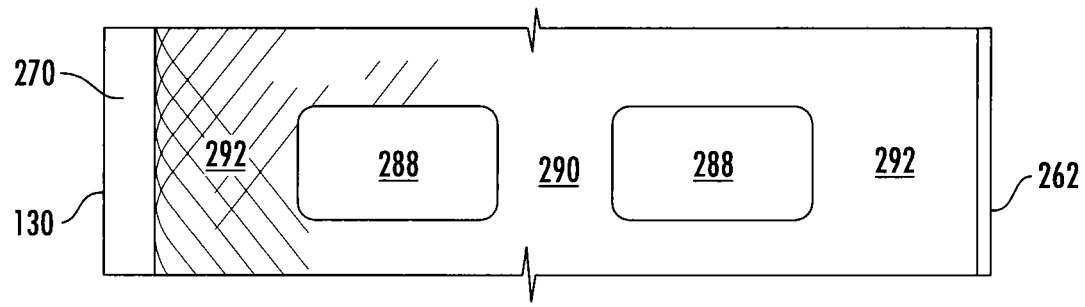
FIG. 23B is a partial top plan view of the external axial surface of the first, second, and third layers of material applied to the hub and mandrel shown in FIG. 23A.
Figure 23A:
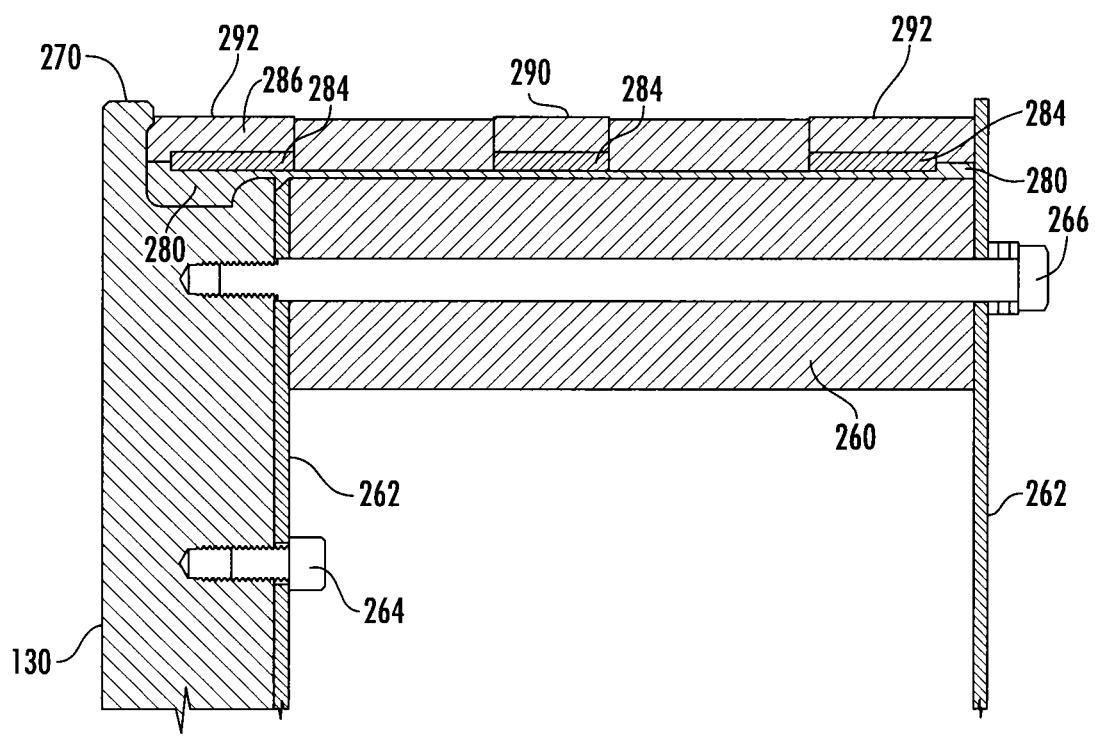
FIG. 23A is a partial cross-sectional view of the filling of the apertures with epoxy to the height of the third layer according to step 614 of the flow diagram shown in FIG. 16.

Referring now to FIGS. 23A-23B, step 614 comprises filling the apertures 288 with epoxy or other suitable material to a thickness substantially equal to the thickness of the third layer 286. It is to be understood that any suitable material can be used instead of epoxy. It is also to be understood that the thickness of the epoxy may vary.

Figure 24B:
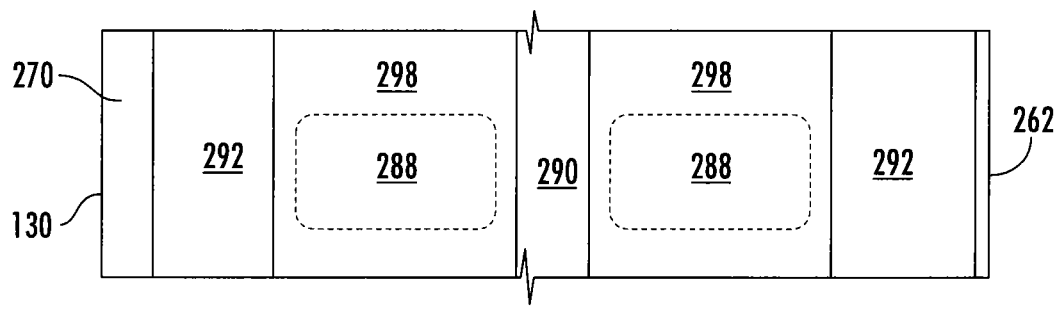
FIG. 24B is a partial top plan view of the external axial surface of the drum shown in FIG. 24A.
Figure 24A:
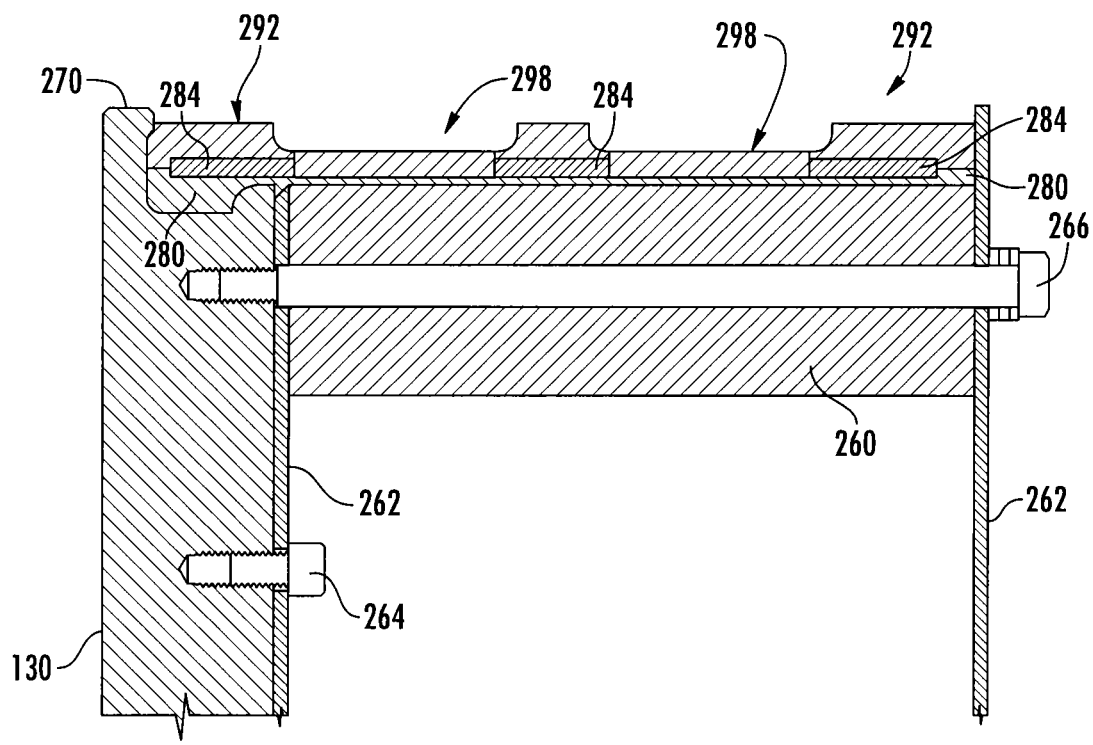
FIG. 24A is a partial cross-sectional view of the two annular grooves cut into the drum according to step 616 of the flow diagram shown in FIG. 16.

Referring now to FIGS. 24A-24B, step 616 comprises forming two or more annular grooves 298 along the entire cylindrical sidewall 276 of the drum 226. The annular grooves 298 may be formed by any method known in the art. In some embodiments, the annular grooves 298 may be formed with a depth less than the thickness of the third layer 286. The depth of the annular grooves 298 may vary, provided that the annular grooves 298 do not reach the second layer 284. In some embodiments, the annular grooves 298 may be parallel to one another, and can encompass the apertures 288. In some embodiments, the annular grooves 298 may be separated by the raised middle zone 290 which also separates the apertures 288. In one example, the annular grooves 298 may also be framed on both sides by raised end zones 292. The annular grooves 298 can function to provide structural support and strength to the cylindrical sidewall 276 of the drum 226, while at the same time minimize the thickness of the cylindrical sidewall 276 disposed inside the air gap 116. It is to be understood that the number of annular grooves 298 may be varied to correspond to the number of apertures 288. It is also to be understood that alternative embodiments of the inventive concept(s) disclosed herein may have no annular grooves 298, or may have a single annular groove 298, as opposed to multiple annular grooves 298, for example.

Figure 25B:
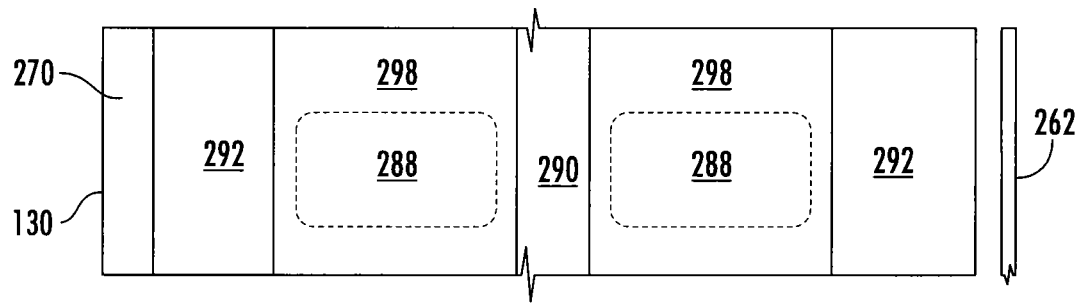
FIG. 25B is a partial top elevated view of the external axial surface of the removal of the mandrel from the drum shown in FIG. 25A.
Figure 25A:
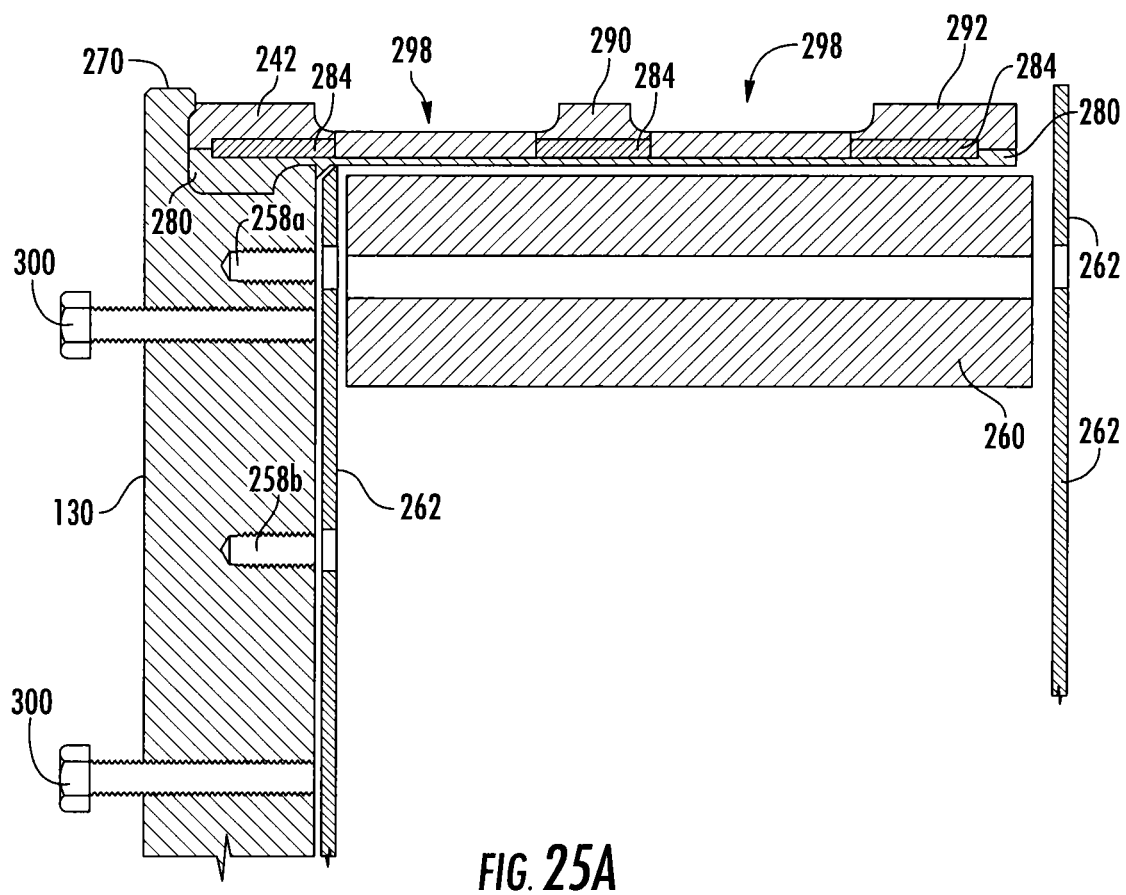
FIG. 25A is a partial cross-sectional view of the removal of the mandrel from the drum according to step 618 of the flow diagram shown in FIG. 16.

Referring now to FIGS. 25A-25B, step 618 comprises removing the mandrel 260 from the drum 226. The short bolt 264 and long bolt 266 can be removed, and two bolts 300 can be used to push the mandrel 260 away from the drum 226 for example. It is to be understood that the mandrel 260 may be removed by any other suitable means known in the art.

Figure 26:
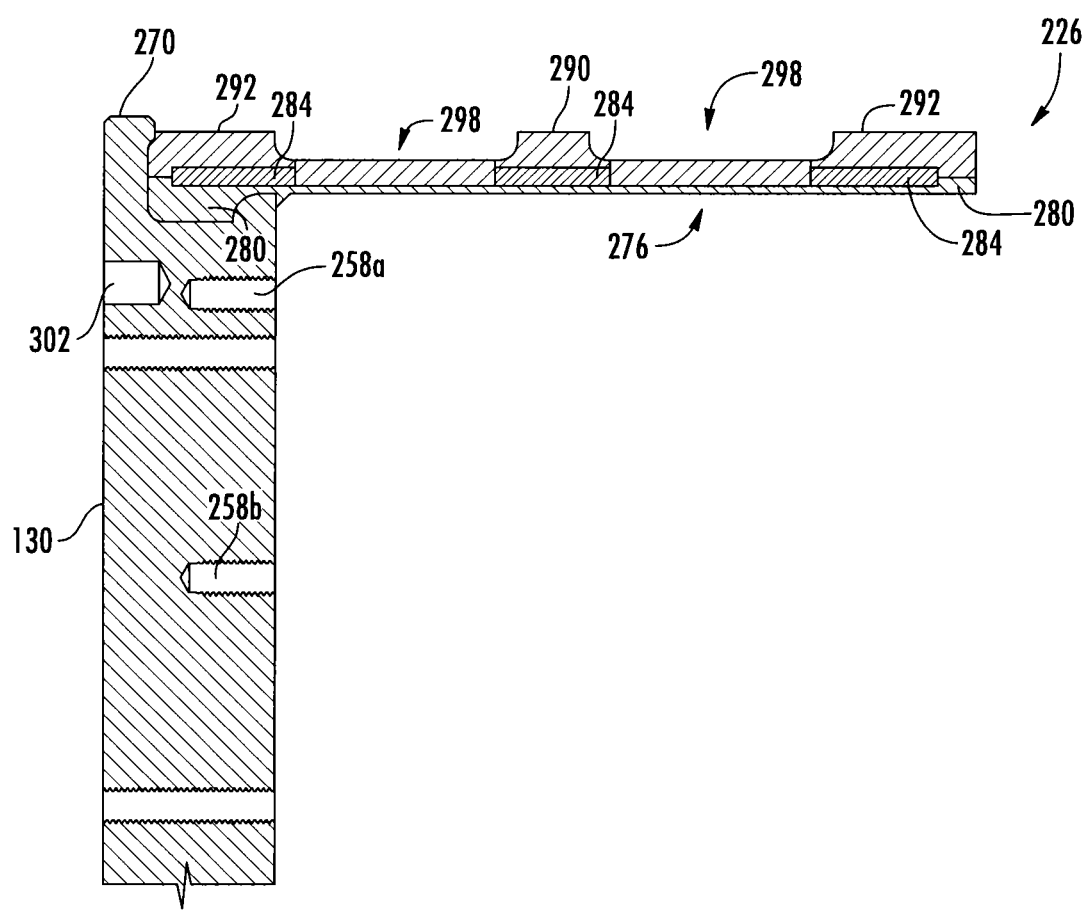
FIG. 26 is a partial cross-sectional view of the finished axial external surface of the drum manufactured according to step 620 of the flow diagram shown in FIG. 16.

Referring now to FIG. 26, step 620 comprises cleaning up and balancing the finished drum 226. If the drum 226 is off-balanced, one or more lightening holes 302 may be drilled into the hub 130. Additionally, the corner of the cylindrical sidewall 276 disposed furthest from the hub 130 may be rounded off. Further, the cylindrical sidewall 276 of the drum 226 may be smoothed or polished, for example. It is to be understood that the drum 226 may be balanced by any other means known in the art, such as sandblasting, grinding, or balancing or correcting weights, and combinations thereof, for example.

It is to be understood that the number of layers comprising the cylindrical sidewall 276 of the drum 226 can be varied from a single layer to four or more layers, for example, and the relative positions of the different layers used may vary. Further, the hub 130 may also comprise the first layer of the drum 226. It is also to be understood that the drum 226 may be manufactured using different methods and materials without departing from the scope and spirit of the inventive concepts disclosed herein. For example, certain arrangements of magnetic field permeable materials may be configured to define a magnetic-field impermeable zone along the sidewall in some embodiments of the instant inventive concepts.

In operation, a generator assembly 100 according to the inventive concepts disclosed herein may generate electricity as follows: the shaft 118 may be connected to the shaft 56 of wind generator turbine 50. As wind rotates the blades 52 of the wind generator turbine 50, mechanical energy is provided to rotate the shaft 118, which in turn rotates the cylindrical sidewall 276 inside the air gap 116 separating the magnet 172 from the coil 192. The alternating magnetic field permeable zones 294 and magnetic field impermeable zones 296 of the cylindrical sidewall 276 may be alternatively disposed between the magnet 172 and the coil 192 as the drum 226 rotates. The magnetic field permeable zones 294 may allow the magnetic field to pass through the cylindrical sidewall 276 of the drum 226, and the magnetic field impermeable zones 296 redirect the magnetic field, such that it does not pass through the cylindrical sidewall 276. This alternating magnetic field creates radial flux, which induces electrical current into the coil 192. The electrical current can then be allowed to flow through an external circuit, and may have its output optimized for its intended use by devices such as rectifiers, inverters, and transformers, for usable voltage and frequency as desired.

The mechanical energy used to rotate shaft 118 of a generator assembly 100 can be supplied from any suitable source such as, but expressly not limited to: a water turbine, a steam turbine, an internal combustion engine, a steam engine, a coal turbine, or a water wheel, for example. The connection between the shaft 56 of the wind generator turbine 50 and the shaft 118 of the generator assembly 100 may be a direct mechanical connection, or alternatively a gearbox, a speed control assembly, or a brake assembly may be used to connect the shaft 56 to the shaft 118. It should also be understood that, because of the nature of the design and the ability to reconfigure the drum 226 with multiple apertures and flux assemblies, this device is well adapted for, but not limited to, low rpm environments, such as wind or water driven turbines, as more than one magnetic field change can be induced in a single rotation of the drum 226.

Figure 27:
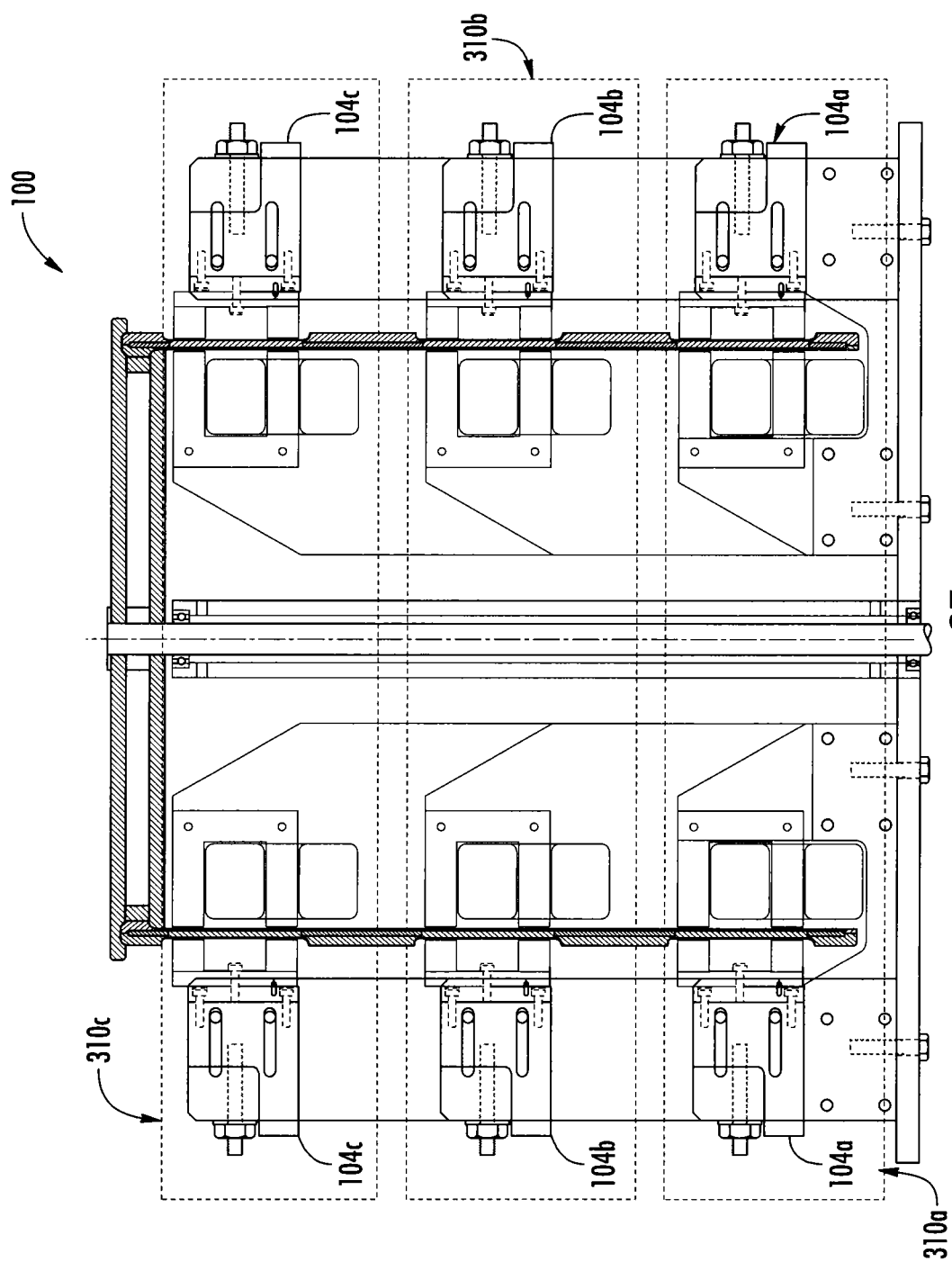
FIG. 27 is a partial side view of a generator of electrical energy in accordance with the inventive concepts disclosed herein, having a plurality of rows of flux assemblies that are angularly offset relative to one another.
Figure 28:
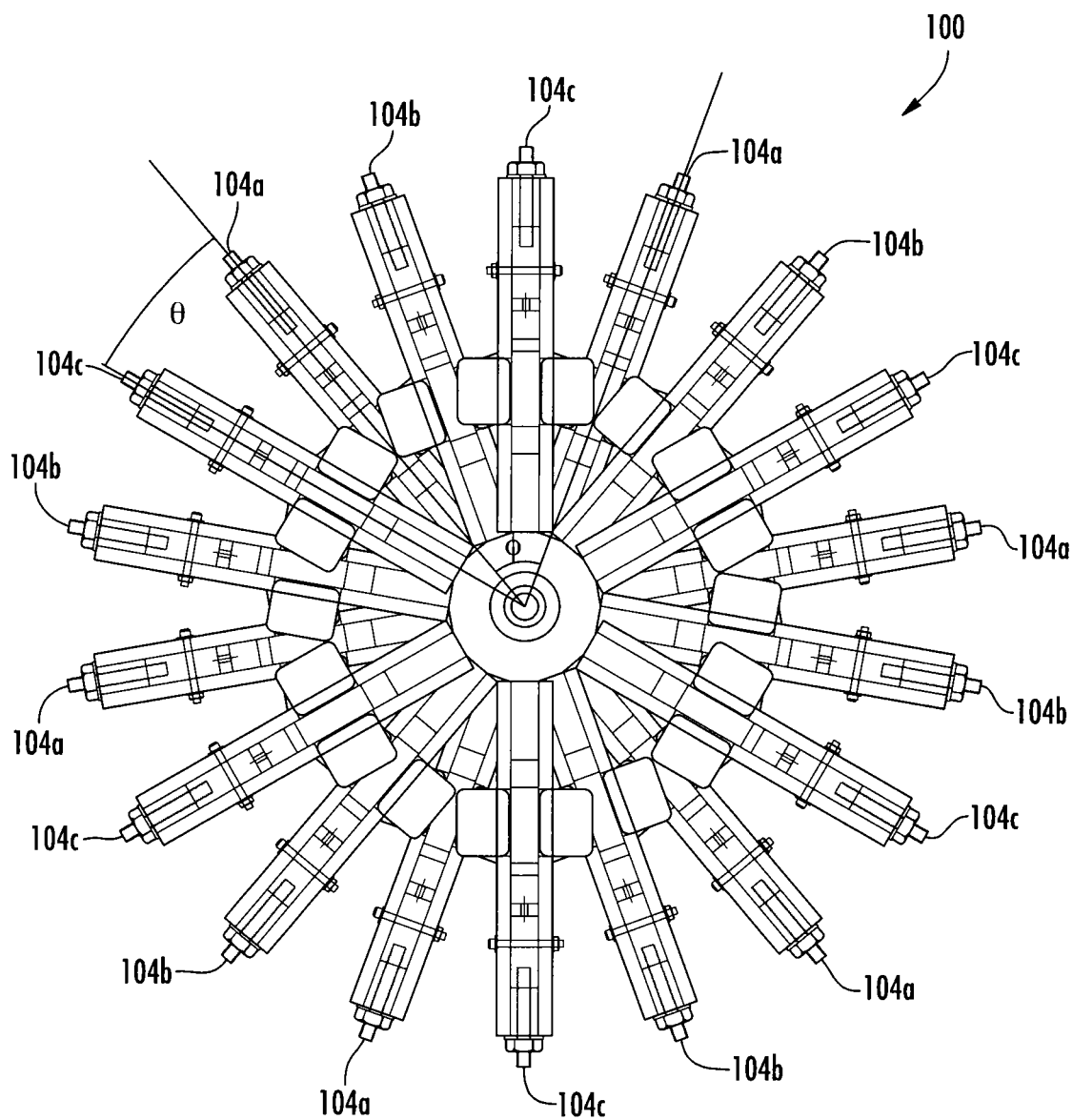
FIG. 28 is a partial front view of the generator of electrical energy of FIG. 27, with the interference drum assembly not shown for clarity.

It is to be understood that the dimensions given and described herein may not be suitable for a commercial embodiment of a generator assembly 100 according to the inventive concepts disclosed herein. A commercial embodiment of a generator assembly 100 built using the inventive concepts disclosed herein may be much larger in dimensions, and may likely include a large number of flux assemblies 104a. An exemplary commercial embodiment of the inventive concepts disclosed herein is shown in FIGS. 27-28. The generator assembly 100 has a plurality of rows of flux assemblies 104a, 104b, and 104c arranged in a plurality of rows 310 in order to increase the output of the generator assembly 100. The plurality of flux assemblies 104a, 104b, and 104c can for example be positioned such that two or more flux assemblies 104a form a row 310a, two or more flux assemblies 104b form a row 310b, and two or more flux assemblies 104c form a row 310c along the drum 226. One, two, or more than three such rows 310a, 310b, and 310c can be formed by plurality of flux assemblies 104a, 104b, and 104c for increased efficiency. As shown in FIG. 28 the flux assemblies 104 within each row 310 can be offset angularly by a fixed amount φ (in this example by) 60°). Further, the flux assemblies 104 between each row 310 can be offset angularly by a fixed amount θ that in this example is 20°. It should be understood that φ and θ can vary and will depend either on the number of flux assemblies 104 within each row 310 and/or the number of rows 310 of the generator assembly 100.

It is to be further understood that while permanent magnets have been described as the magnetic field source, electromagnets, combinations of permanent magnets and electromagnets, or any other suitable magnetic field source may also be used with the inventive concepts disclosed herein without departing from the scope and spirit thereof.

Figure 29:
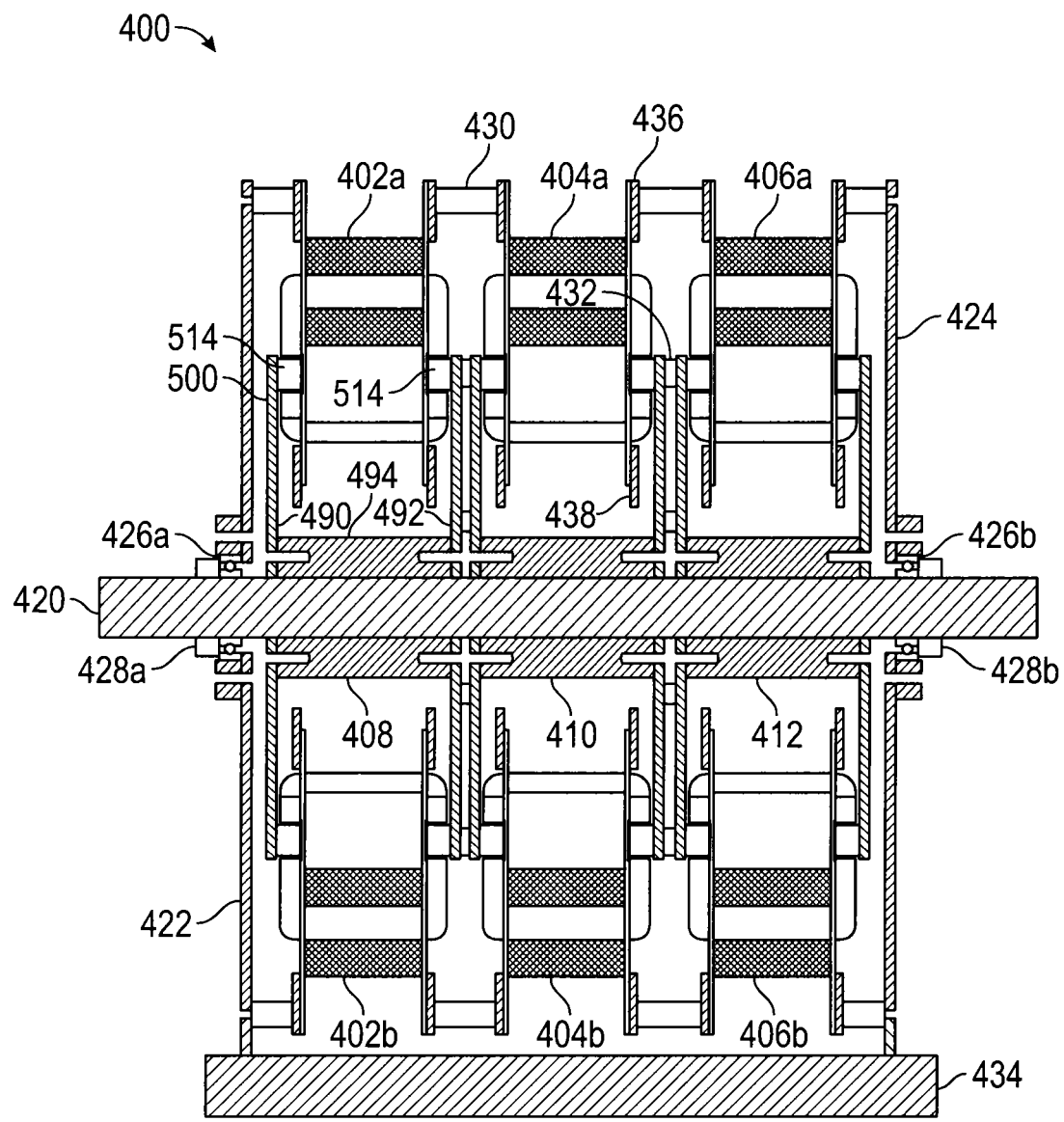
FIG. 29 is a partial side view of a motor/generator in accordance with the inventive concepts disclosed herein, having a plurality of interference drums and a plurality of rows of flux assemblies.

Referring now to FIG. 29, illustrated therein is a motor/generator 400 according to the inventive concepts disclosed herein. In this embodiment, the motor/generator 400 is provided with a plurality of flux assemblies 402a, 402b, 404a, 404b, 406a, and 406b, arranged in a plurality of rows, each row having a drum assembly 408, 410, and 412 associated with therewith. For the sake of clarity, the flux assemblies 402a, 402b, 404a, 404b, 406a, and 406b of each of the plurality of rows of flux assemblies are shown with like number indicators (i.e. 402 for row one (1), 404 for row two (2), and 406 for row three (3)) with a letter added to differentiate each of the different flux assemblies on the same row. For instance, in one embodiment, the first row of flux assemblies may be provided with six or more flux assemblies (e.g., 12 flux assemblies in FIG. 32) in which case the flux assemblies of the first row would be numbered 402a, 402b, 402c, 402d, 402e, and 402f.

As shown in FIG. 29, the motor/generator 400 is further provided with a shaft 420, a first end plate 422, a second end plate 424, a plurality of shaft bearings 426a, and 426b, a plurality of shaft bearing seals 428a, and 428b, a plurality of spacers 430 (only one of which is numbered), a plurality of drum spacers 432 (only one of which is numbered), a plurality of outer connection rings 436 (only one of which is numbered), a plurality of inner connection rings 438 (only one of which is numbered), and a base 434.

The plurality of outer connection rings 436 are provided having a predetermined circumference and a plurality of apertures (not shown) configured to facilitate connection to the flux assemblies 402a, 402b, 404a, 404b, 406a, and 406b by any suitable means known in the art, such as screws, rivets, welds, adhesives, and combinations thereof, for example.

The plurality of inner connection rings 438 are provided having a predetermined circumference and a plurality of apertures (not shown) configured to facilitate connection to the flux assemblies 402a, 402b, 404a, 404b, 406a, and 406b by any suitable means known in the art, such as screws, rivets, welds, adhesives, and combinations thereof, for example.

Figure 32:
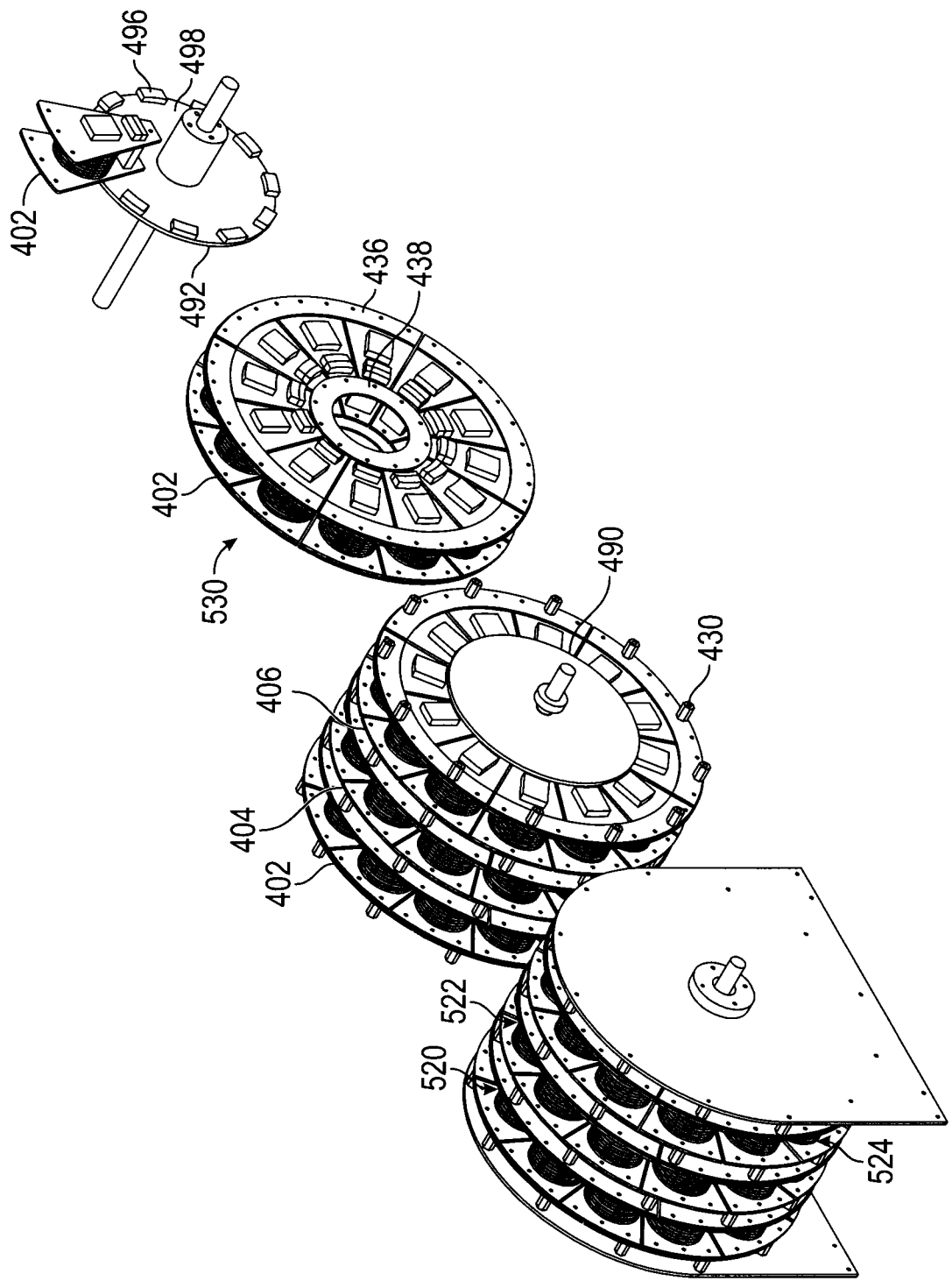
FIG. 32 is a partially exploded perspective view of a motor/generator in accordance with the inventive concepts disclosed herein.

As shown in FIGS. 29 and 32, the plurality of spacers 430 are provided having a length designed to facilitate connection of the plurality of outer connection rings 436, the plurality of flux assemblies 402a, 402b, 404a, 404b, 406a, and 406b, and the first and second end plates 422 and 424 by any suitable means known in the art, such as screws, rivets, welds, adhesives, and combinations thereof, for example.

In the embodiment shown, the plurality of flux assemblies 402a, 402b, 404a, 404b, 406a, and 406b are substantially the same, therefore, in the interest of brevity, only the features of flux assembly 402a will be numbered and described herein. In FIGS. 29-30B, the flux assembly 402a is provided with a first flux plate 450, a second flux plate 452, a coil assembly 454, and a magnet assembly 456. In the embodiment shown, the coil assembly 454 and the magnet assembly 456 extend at least partially through and are mounted onto the first flux plate 450 and the second flux plate 452 along a central axis of the first flux plate 450 and the second flux plate 452, and are disposed opposite one another separated by an air gap 466. Thus, in the embodiment shown, a first one of the air gaps 466 is positioned adjacent to and bordered by the first flux plate 450, and a second one of the air gaps 466 is positioned adjacent to and bordered by the second flux plate 452. While the magnet assembly 456 is shown as being closer to the shaft 420 of the motor/generator 400 than the coil assembly 454, it is to be understood that alternatively the coil assembly 454 can be disposed closer to the shaft 420 of the motor/generator 400 than the magnet assembly 456.

The coil assembly 454 can be any conventional coil 455 and can have any type or number of windings, cores, and/or poles, as long as the coil 455 is capable of receiving a magnetic flux from the magnet assembly 456.

The magnet assembly 456 may be provided with a pair of magnets 457, connected with a magnetically-conductive bar 458, such that they form a unitary magnet 459. The magnets 457 can be any magnets made of any suitable material, and can be isotropic or anisotropic and combinations thereof. The magnets 457 can be of any strength, and can have varying sizes and shapes depending on the size and output requirements of the motor/generator 400. The magnets 457 can be arranged in any configuration consistent with defining at least a part of the air gap 466 between the magnet assembly 456 and the coil assembly 454, and preferably being in magnetic communication with the coil assembly 454. The magnets 457 may be permanent magnets, electromagnets, and combinations thereof. In one embodiment, the magnet assembly 456 can comprise a single magnet (not shown).

In the embodiment shown, the first and second flux plates 450 and 452 of the flux assembly 402a are substantially the same, therefore, in the interest of brevity, only the features of the first flux plate 450 will be numbered and described herein. The first flux plate 450 is formed of a suitable non-magnetically conductive material such as, for instance, a material of the type sold under the name Garolite G-10, acrylic plastics such as Plexiglas™, or any other material of suitable strength and durability, and is provided having a wedge shape, in which a taper between one end to the other end is set forth by an angle 468. The first flux plate 450 also includes a first face 470, a coil assembly mounting aperture 471, a second face 472 (FIG. 30A), a magnet assembly mounting aperture 473, an outer edge 474, an inner edge 476, an first peripheral edge 478, a second peripheral edge 480, a groove 482, a plurality of outer ring fastener apertures 484 (only one of which is numbered), and at least one inner ring fastener aperture 488.

The first and second flux plates 450 and 452 function to support the coil 455 and the magnet assembly 456, as well as to structurally attach the flux assembly 402a to the plurality of outer connection rings 436, and the plurality of inner connection rings 438.

The coil assembly mounting aperture 471 and the magnet assembly mounting aperture 473 function to allow for the attachment of the coil assembly 454 and the magnet assembly 456 to first and second flux plates 450 and 452 of the flux assembly 402a.

In some embodiments of the motor/generator 400, the angle 468 of the first flux plate 450 may be determined by the number of flux assemblies 402a that will make up one row of the motor/generator 400. For instance, in the embodiment shown in FIG. 32, the motor/generator 400 comprises three rows of flux assemblies 520, 522, and 524 with each row having twelve (12) flux assemblies 402, 404, and 406. In such an embodiment, the angle 468 of the first flux plate 450 would be less than or equal to 30°. When the angle 468 is 30° each of the flux assemblies 402, 404, and 406 may be successively arranged such that the first peripheral edge 478 of the first flux plate 450 of one flux assembly 402, 404, or 406 would be in contact with the second peripheral edge 480 of the adjacent flux assembly 402, 404, or 406 with the flux assemblies 402, 404, and 406 connected to the plurality of outer connection rings 436 and the plurality of inner connection rings 438 to form a substantially circular array 530.

It should be understood, however, that the angle 468 of the first flux plate 450 may be a predetermined angle that is not necessarily associated with the number of flux assemblies that will make up one row of the motor/generator 400. For example, in one embodiment (not shown) the first row of flux assemblies of the motor/generator 400 may be provided with six (6) flux assemblies 402a-f with the angle 468 of the first flux plate 450 of each of the flux assemblies 402a-f being the predetermined absolute angle of 30°. In such an embodiment, the flux assemblies 402a-f may be arranged such that the first peripheral edge 478 of the first flux plate 450 of one flux assembly would be separated from the second peripheral edge 480 of the adjacent flux assembly by an absolute angle of substantially 30°. Or, in other words, the central axis of the first and second flux plates 450 and 452 of each flux assembly 402a-f would be separated by an absolute angle of substantially 60°.

Although the first and second flux plates 450 and 452 are shown and described herein as individual plates that may be arranged to form a substantially circular array 530 as shown in FIG. 32, it should be understood that a single first flux plate (not shown) and a single second flux plate (not shown) may form a substantially circular array (not shown). In such an embodiment, coil assembly apertures and magnet assembly apertures similar to 471 and 473 would be cut or formed through the single first and second flux plates to facilitate connection of the coil assembly 454 and magnet assembly 456 to the single first and second flux plates thereby forming the substantially circular array. In one such embodiment, outer connection rings 436 and inner connection rings 438 may be connected to the single first and second flux plates to provide further stiffness and support. In another embodiment, the single first and second flux plates may be formed of sufficiently strong materials as to negate the necessity of the outer and inner connection rings.

Referring now to FIGS. 29 and 31, in the embodiment shown, the drum assemblies 408, 410, and 412 are substantially the same, therefore, in the interest of brevity, only the features of drum assembly 408 will be numbered and described herein. The drum assembly 408 is provided with a first rotor plate 490, a second rotor plate 492, a hub 494, a plurality of magnetically permeable sections 496 (only one of which is numbered in FIG. 31), and a plurality of magnetically impermeable sections 498 (only one of which is numbered in FIG. 31) interleaved with the magnetically permeable sections 496.

Each of the first and second rotor plates 490 and 492 of the drum assembly 408 are substantially the same, therefore, in the interest of brevity, only the features of the first rotor plate 490 will be numbered and described herein. The first rotor plate 490 is provided having an outward facing surface 500, an inward facing surface 502, a peripheral edge 504, a central aperture 506, a first set of connection apertures 508 (only one of which is numbered in FIG. 31), and a second set of connection apertures 510 (only one of which is numbered in FIG. 31).

The inward facing surfaces 502 of the first rotor plate 490 and the second rotor plate 492 can be attached to opposite ends of the hub 494 by any suitable means known in the art, such as screws, rivets, welds, adhesives, and combinations thereof, for example, with the central apertures 506 coaxially disposed and substantially aligned with a central aperture (not numbered) of the hub 494.

The plurality of magnetically permeable sections 496 can be made of a magnetically permeable material such as, for instance, layered silicon steel, or iron, and are provided with an outer edge 512 forming an arcuate surface having an arc the degree measure of which is substantially the same as a circumference of the peripheral edge 504 of the first and second rotor plates 490 and 492.

In one embodiment of the motor/generator 400, the plurality of magnetically permeable sections 496 can be attached to the inward facing surface 502 of the first and second rotor plates 490 and 492 by any suitable means known in the art, such as screws, rivets, welds, adhesives, and combinations thereof, for example. The plurality of magnetically permeable sections 496 substantially directly opposite each other (where one magnetically permeably section 496 is attached to the first rotor plate 490 and one magnetically permeably section 496 is attached to the second rotor plate 492) and form a pair of magnetically permeable sections 514. The plurality of magnetically permeable sections 496 may be arranged on the inward facing surfaces 502 in a symmetrically spaced apart array with the outer edge 512 substantially aligned with the outer peripheral edge 504 of the first and second rotor plates 490 and 492. It should be noted, however, that in some embodiments of the motor/generator 400, the plurality of magnetically permeable sections 496 may be un-symmetrically arranged on the inward facing surface 502 of the first and second rotor plates 490 and 492.

In one embodiment of the motor/generator 400, the drum assembly 408 may be provided having a number of pairs of magnetically permeable sections 514 that is less than the number of flux assemblies 402a-n. For example, in the example shown in FIG. 32, the first and second rotor plates 490 and 492 are provided a different number of equally spaced magnetically permeable sections 496, and equally spaced flux assemblies 402a-n so as to allow the motor/generator 400 to be configured such that only one pair of magnetically permeable sections 496 is positioned in phase with the coil assembly 454 and the magnet assembly 456 at any given instant in time. By way of example, FIG. 30B shows magnetically permeable sections 496a and 496b. In FIG. 30B, magnetically permeable section 496a is in phase with the coil assembly 454 and the magnet assembly 456 and magnetically permeable section 496b is 2.7 degrees out of phase with the coil assembly 454 and the magnet assembly 456 as represented by the angle $\beta$. For the sake of clarity, it should be understood that magnetically permeable section 496a and 496b are the same magnetically permeable section just shown as though it had been rotated, for instance, by a windmill. In another embodiment, the motor/generator 400 may be provided having a number of pairs of magnetically permeable sections 514 that is more than the number of flux assemblies 402a-n. In another embodiment, the motor/generator 400 may be provided having the same number of pairs of magnetically permeable sections 514 as flux assemblies 402a-n wherein the pairs of magnetically permeable sections 514 are arranged such that only one of the pairs of magnetically permeable sections 514 is disposed within the air gap 466 of any one of the flux assemblies 402a-n at a time.

As best shown in FIG. 29, the drum assembly 408 is connected to the shaft 420 and is adapted to rotate when the shaft 420 is rotated. The drum assembly 408 is at least partially disposed inside the air gap 466 between the coil assembly 454 and the magnet assembly 456 of the flux assembly 402a. Rotation of the drum assembly 408 alternately positions the plurality of magnetically permeable sections 496 and the plurality of magnetically impermeable sections 498 of the drum 408 inside the air gap 466.

Figure 33:
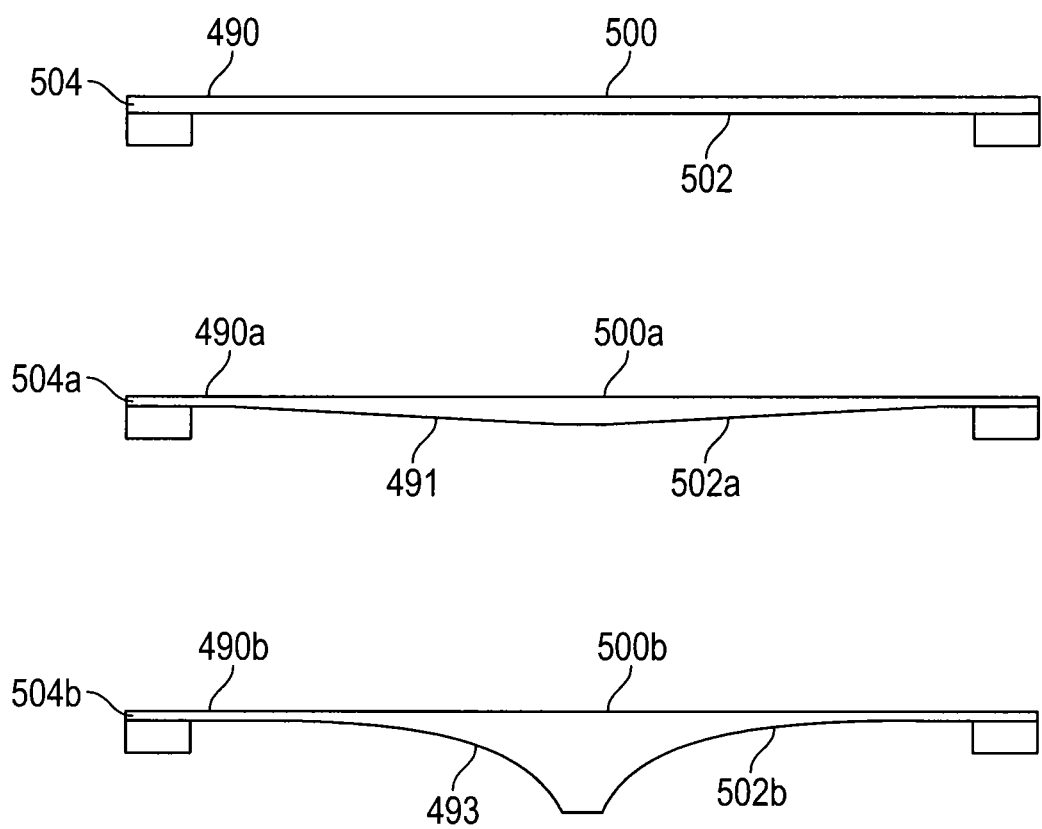
FIG. 33 is a cross-sectional view of exemplary rotor plates constructed in accordance with the present disclosure.

Referring now to FIG. 33, in one embodiment, the rotor plate 490 of the drum assembly 408 may be provided wherein the outward facing surface 500 and the inward facing surface 502 are planar surfaces extending in a substantially parallel fashion relative to one another from the central aperture 506 (not shown) to the peripheral edge 504.

In another embodiment, the drum assembly 408 may be provided with one or more rotor plate 490a in which mass is concentrated near a central portion of the rotor plate 490a. In the embodiment shown, the rotor plate 490a has an outward facing surface 500a that forms a substantially planar surface, and an inward facing surface 502a extending at a non-parallel angle 491 at least partially between a central aperture 506a (not shown) to a peripheral edge 504a. In other words, the rotor plate 490a tapers inwardly toward the outer edge, such that the rotor plate 490a is formed having a first thickness when measured at the central aperture 506a, and a second thickness when measured at the peripheral edge that is less than the first thickness.

In another embodiment, the drum assembly 408 may be provided with a rotor plate 490b in which mass is concentrated near a central portion of the rotor plate 490b, which constitutes the axis of rotation, in a manner that is different from the rotor plate 490a. In the embodiment shown, the rotor plate 490b has an outward facing surface 500b that forms a substantially planar surface and an inward facing surface 502b that is arcuately shaped so as to have an arcuate section 493 extending at least partially between a central aperture 506b (not shown) to a peripheral edge 504b. In other words, the rotor plate 490b is formed having a first thickness when measured at the central aperture 506b, and a second thickness when measured at the peripheral edge 504b that is less than the first thickness and the arcuate section 493 extends from the first thickness to the second thickness. In some embodiments, the outward facing surface 500b can be designed to have an arcuate section as well for increasing mass near the central portion of the rotor plate 490b. As will be understood by one skilled in the art, the rotor plates 490a and 490b are designed to have sufficient structural stiffness and strength, but a reduced moment of inertia as compared to the rotor plate 490, for example. For instance, all conditions being equal, any solid cylinder will accelerate and decelerate faster than a tubular cylinder of any size, shape or weight. Likewise, any solid sphere will accelerate and decelerate faster than any solid cylinder. This example demonstrates that the moment of inertia, is governed by the distribution of mass in relation to the rotational axis. The more the mass is distributed toward the rotational axis, the lower the moment of inertia, thus the more rapid the acceleration and deceleration.

As shown in FIG. 32 the flux assemblies 402, 404, and 406 within each row 520, 522, and 524 can be offset angularly by a fixed amount φ (in this example by 30°). Further, the flux assemblies 402, 404, and 406 between each row 520, 522, and 524 can be offset angularly by a fixed amount θ that in this example is 10°. It should be understood that φ and θ can vary and will depend either on the number of flux assemblies 402, 404, and 406 within each row 520, 522, and 524 and/or the number of rows 520, 522, and 524 of the motor/generator 400. In the example shown, the eleven magnetically permeable sections 496 on the rotor plates are angularly aligned, rather than being angularly offset. Thus, as the shaft 420 rotates, the magnetically permeable sections 496 will be moving relative to, i.e., past, particular ones of the flux assemblies 402, 404 and 406 within each row 520, 522 and 524. As each of the magnetically permeable sections 496 is moved past one of the flux assemblies, the magnetically permeable section 496 is drawn to the flux assembly, and then pulled away from the flux assembly. The point of maximum force required to move a particular one of the magnetically permeable sections 496 past a particular one of the flux assemblies is referred to herein as the magnetically permeable section 496 and the flux assembly being in phase. In one embodiment, the angular arrangement between the magnetically permeable sections 496 and the flux assemblies 402, 404 and 406, for example, places a first one of the magnetically permeable sections 496 on a first rotor plate 490a and a second one of the magnetically permeable sections 496 on a second rotor plate 490b associated with one of the rows 520, 522 and 524, in phase with one of the flux assemblies 402, 404, and 406 at a single instant of time, whereby all of the other magnetically permeable sections 496 are out of phase. Thus, if the first one and second one of the magnetically permeable sections 496 are within the row 520, then, in this example, all of the other magnetically permeable sections 496 in the row 520, and all of the other magnetically permeable sections 496 in the row 522 and 524 are out of phase at that instant of time. In the example of FIG. 32 in which the motor/generator 400 includes 36 flux assemblies disposed within three rows, and two rotor plates 490a and 490b associated with each row of flux assemblies, and eleven magnetically permeable sections 496 on the rotor plates 490a and 490b (33 total magnetically permeable sections 496), only one flux assembly is in phase with a pair of the magnetically permeable sections 496 in each 0.9 degree angular position.

As shown in FIG. 32, for example, within the row 520, the magnetically permeable sections 496 are spatially disposed and arranged around the axis to magnetically couple with the flux assemblies to form a first angular relationship. Within the row 522, the magnetically permeable sections 496 are spatially disposed and arranged around the axis to magnetically couple with flux assemblies to form a second angular relationship. The first angular relationship is angularly offset from the second angular relationship by a predetermined amount, e.g., 10 degrees. Although in the example described herein the angular relationship in each row 520, 522, and 524 of flux assemblies 402, 404, and 406 is angularly offset by 10 degrees and the magnetically permeable sections 496 are angularly aligned throughout the rows 520, 522 and 524, it should be understood that in another embodiment the flux assemblies 402, 404 and 406 within each row 520, 522 and 524 may be angularly aligned and the magnetically permeable sections 496 may be offset by 10 degrees to achieve the offset angular relationship between each row 520, 522 and 524. Further, the particular arrangement is configured to place a first predetermined subset of the magnetically permeable sections 496 and a second predetermined subset of the flux assemblies 402, 404, and 406 in phase at an instant of time. In the example shown, the first predetermined subset is only one of the magnetically permeable sections 496, and the second predetermined subset is only one of the flux assemblies 402, and the particular magnetically permeable section 496 and the flux assembly 402 that are in phase changes on a 0.9 degree angular spacing as the shaft 420 rotates. Reducing the number of magnetically permeable section(s) 496 and flux assembly(ies) 402, 404, and 406 that are in phase at any particular instant of time reduces the torque required to turn the shaft 420. It should be understood, however, that the first predetermined subset and the second predetermined subset are equal, but that the size of the first predetermined subset and the second predetermined subset can change. For example, in some embodiments the first predetermined subset and the second predetermined subset can be two or more (but less than all).

In one embodiment, the present disclosure describes the electromagnetic motor/generator 400, comprising: a first flux assembly 402 having at least one coil 454 and at least one magnetic field source 456, separated by a first gap 466 and a second gap 466; an interference drum 408 having an axis, the interference drum 408 including a first rotor plate 490, a second rotor plate 492, a hub 494 connecting the first rotor plate 490 and the second rotor plate 492, at least one first magnetically permeable section 496a attached to the first rotor plate 490, and at least one second magnetically permeable section 496b attached to the second rotor plate 492; and wherein the interference drum 408 is movable relative to the at least one coil 454 and to the at least one magnetic field source 456 to alternatively position the at least one first magnetic field permeable section 496a and the at least one second magnetic field permeable section 496b inside the first and second gaps 466.

In one embodiment, the present disclosure describes a method of operating a motor/generator 400 comprising: simultaneously passing a first magnetically permeable section 496a mounted to a first rotor plate 490 through a first gap 460 separating a coil 454 and magnetic field source 456 and a second magnetically permeable section 496a mounted to a second rotor plate 492 through a second gap 466 separating the coil 454 and magnetic field source 456.

In one embodiment, the present disclosure describes an electromagnetic motor/generator 400, comprising: a first row 520 of first flux assemblies 402, the first flux assemblies 402 arranged around an axis; a second row 522 of second flux assemblies 404, the second flux assemblies 404 arranged around the axis; an interference drum 408 being rotatable relative to the first flux assemblies 402 and the second flux assemblies 404, and having a plurality of first magnetically permeable sections 496a spatially disposed and arranged around the axis to magnetically couple with the first flux assemblies 402 to form a first angular relationship, and a plurality of second magnetically permeable sections 496b spatially disposed and arranged around the axis to magnetically couple with the second flux assemblies 404 to form a second angular relationship, wherein the first angular relationship is angularly offset from the second angular relationship by a predetermined amount, and wherein the arrangement of the first flux assemblies 402, the second flux assemblies 404, the first magnetically permeable sections 496a, and the second magnetically permeable sections 496b is configured to place a first predetermined subset of the first and second magnetically permeable sections 496a and 496b and a second predetermined subset of the first and second flux assemblies 402 and 404 in phase at an instant of time.

In one embodiment, the of the present disclosure describes an interference drum 408 for a motor/generator, comprising: a first circular rotor plate 490 including a first outward facing surface 500a, a first inward facing surface 502a, a first central aperture 506a, and a plurality of first magnetically permeable sections 496a attached to the first inward facing surface 502a angularly spaced a predetermined distance apart; a second circular rotor plate 492 including a second outward facing surface 500b, a second inward facing surface 502b, a second central aperture 506b, and a plurality of second magnetically permeable sections 496b attached to the second inward facing surface 502b angularly spaced a predetermined distance apart; and a hub 494 having a first end, a second end, and an aperture extending from the first end to the second end; wherein the first circular rotor plate 490 is attached to the second circular rotor plate 492 with the first and second central apertures 506a and 506b aligned with the aperture of the hub 494 and with the hub 494 between the first inward facing surface 502a and the second inward facing surface 502b.

In another embodiment, the interference drum 408 for the motor/generator is provided with the first outward facing surface 500a of the first circular rotor plate 490 and the second outward facing surface 502b of the second rotor plate 492 are substantially planar surfaces and a thickness of the first circular rotor plate 490 and the second circular rotor plate 492 increases from the peripheral edge 504 of the first circular rotor plate to the first central aperture 506a and a second peripheral edge 504 of the second circular rotor plate 492 to the second central aperture 506b.

While the embodiments of the motor/generator 400 have been described herein as having flux assemblies that are symmetrically arranged, it should be understood that in some embodiments the flux assemblies may be un-symmetrically arranged. Further, is should be understood that each of the plurality of rows of flux assemblies may each contain an equal number of flux assemblies, the number of flux assemblies in each of the plurality of rows may be un-equal, or a number of the plurality of rows of flux assemblies may be provided with an equal number of flux assemblies and a number of the plurality of rows of flux assemblies may be provided with an un-equal number of flux assemblies.

Although the motor/generator 400 has been described and shown herein as having a plurality of rows of flux assemblies, it should be understood that in another embodiment the motor/generator 400 may be provided having only one row of flux assemblies.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the scope and coverage of the inventive concepts disclosed and claimed herein.

What is claimed is:

1. An electromagnetic motor/generator, comprising:
a flux assembly having at least one coil and at least one magnetic field source, separated by a first gap and a second gap;
an interference drum having an axis, the interference drum including a first rotor plate having a first outward facing surface and a first inward facing surface, a second rotor plate having a second outward facing surface and a second inward facing surface, a hub connecting the first rotor plate and the second rotor plate in a spaced apart relationship with the first inward facing surface of the first rotor plate and the second inward facing surface of the second rotor plate facing each other, at least one first magnetically permeable section attached to the first inward facing surface of the first rotor plate, and at least one second magnetically permeable section attached to the second inward facing surface of the second rotor plate, the at least one first magnetically permeable section and the at least one second magnetically permeable section arranged substantially directly opposite each other; and
wherein the interference drum is movable through a circular path relative to the at least one coil and to the at least one magnetic field source to position the at least one first magnetic field permeable section and the at least one second magnetic field permeable section inside the first and second gaps at substantially a same instant in time.

2. The electromagnetic motor/generator from claim 1, wherein the first and second gaps are axial gaps.

3. The electromagnetic motor/generator of claim 1, wherein the interference drum is configured to generate a changing magnetic flux in the at least one coil.

4. The electromagnetic motor/generator of claim 3, wherein the magnetic flux is radial magnetic flux.

5. The electromagnetic motor/generator of claim 1, further comprising a plurality of flux assemblies symmetrically arranged around the axis relative to one another.

6. The electromagnetic motor/generator of claim 5, wherein pairs of flux assemblies are connected in series and each pair of flux assemblies is further connected to another pair of flux assemblies in series to form 3 phases interleaved at 60 electrical degrees from each other.

7. The electromagnetic motor/generator of claim 5, wherein a first set of the flux assemblies form a first row and the electromagnetic generator further comprises a second set of the flux assemblies forming a second row, the second row of flux assemblies angularly offset from the first row.

8. The electromagnetic motor/generator of claim 7 wherein the flux assemblies in the first row are symmetrically arranged with the flux assemblies in the second row.

9. The electromagnetic motor/generator of claim 1, wherein the first and second magnetic field sources comprises a permanent magnet.

10. The electromagnetic motor/generator of claim 1, wherein the first and second magnetic field sources comprises an electromagnet.

11. The electromagnetic motor/generator of claim 1, wherein the first rotor plate supports two or more first magnetically permeable sections and the second rotor plate supports two or more second magnetically permeable sections, the two or more first magnetically permeable sections and the two or more second magnetically permeable sections being separated by two or more zones having less magnetic permeability.

* * * * *